(12) United States Patent
Johnson, III

(10) Patent No.: US 8,806,617 B1
(45) Date of Patent: Aug. 12, 2014

(54) SYSTEM AND METHOD FOR MAINTAINING SERVER DATA INTEGRITY

(75) Inventor: Robert E. Johnson, III, Crown Point, IN (US)

(73) Assignee: Cimcor, Inc., Merrillville, IN (US)

(*) Notice: Subject to any disclaimer, the term of this patent is extended or adjusted under 35 U.S.C. 154(b) by 1548 days.

(21) Appl. No.: 11/836,446

(22) Filed: Aug. 9, 2007

Related U.S. Application Data

(63) Continuation of application No. 10/685,189, filed on Oct. 14, 2003, now abandoned.

(60) Provisional application No. 60/418,003, filed on Oct. 14, 2002.

(51) Int. Cl.
*G06F 11/00* (2006.01)

(52) U.S. Cl.
USPC .......................................................... 726/22

(58) Field of Classification Search
USPC ............ 713/193, 189; 726/32, 33, 22, 23, 24, 726/30; 707/634, E17.001
See application file for complete search history.

(56) References Cited

U.S. PATENT DOCUMENTS

| | | | | |
|---|---|---|---|---|
| 5,832,522 | A * | 11/1998 | Blickenstaff et al. | 707/204 |
| 6,351,811 | B1 * | 2/2002 | Groshon et al. | 713/176 |
| 6,618,735 | B1 * | 9/2003 | Krishnaswami et al. | 707/203 |
| 6,714,952 | B2 * | 3/2004 | Dunham et al. | 707/645 |
| 6,751,604 | B2 * | 6/2004 | Barney et al. | 1/1 |
| 6,804,778 | B1 * | 10/2004 | Levi et al. | 713/176 |
| 6,931,552 | B2 * | 8/2005 | Pritchard et al. | 726/34 |
| 6,944,133 | B2 * | 9/2005 | Wisner et al. | 370/242 |
| 6,971,018 | B1 * | 11/2005 | Witt et al. | 713/187 |
| 7,290,063 | B2 * | 10/2007 | Kalliokulju et al. | 709/247 |
| 2002/0026605 | A1 * | 2/2002 | Terry | 714/37 |
| 2002/0069363 | A1 * | 6/2002 | Winburn | 713/200 |
| 2004/0260968 | A1 * | 12/2004 | Edwards et al. | 714/4 |

OTHER PUBLICATIONS

Glaskowsky, Peter N. Microsoft Opens Windows Plans. Microprocessor Report. May 2000. vol. 14, Issue 5; p. 33.*
PGP Security's Cybercop Monitor Product named Best in Class Security by Datamation and Network News. PR Newswire. Santa Clara: Mar. 2000.*
XML-Xpress cuts size for lossless file compression. Anonymous. Unisys World. Austin. Mar. 2001. vol. 22, Iss 3; p. 18, 1 pgs.*
Go under the hood of Microsoft DNS. Andrew LePage. Windows professional. Rochester: Jun. 2002. vol. 7. Issue 6; p. 6, 3 pgs.*

* cited by examiner

*Primary Examiner* — Beemnet Dada
(74) *Attorney, Agent, or Firm* — Ice Miller LLP

(57) ABSTRACT

The System Integrity Guardian can protect any type of object and repairs and restores the system back to its original state of integrity. The Client component is the user interface for administering the System Integrity Guardian environment. An administrator can determine which servers to protect, which objects to protect, and what actions will be taken when an event that breaches integrity occurs. The Monitor Agent component is the watchdog of the System Integrity Guardian that captures and addresses any event that occurs on any object being protected. The Server component includes the server and the Protected Object Central Repository. The authoritative copies are maintained, digital signatures are created and stored, objects are validated, and communication between the three units is performed.

34 Claims, 24 Drawing Sheets

| | - Data and Server Integrity (Client & Administration Tool) | | | |
|---|---|---|---|---|
| File View Connection Reports Help | | | | |

Catalog (Locked)

- 127.0.0.1
  - East Coast
    - DNS Server
    - Firewall
    - Primary File Server
    - Production Web Server
    - Test Server — 442
      - Catalog (Locked) — 440
      - Router
  - West Coast

| Event Log | Intrusion Log | Authorized Change Log | MiniBrowser View | Object Group Status |
|---|---|---|---|---|

| Intrusion Nu... | Date/Time | Description | Size | User |
|---|---|---|---|---|
| 0000044 | 2003/10/13 04:23:06.094 | c:\online catalog\index.htm | 13,288 | BUILTIN |
| 0000043 | 2003/10/13 04:22:52.299 | c:\online catalog\index.htm | 13,284 | BUILTIN |
| 0000042 | 2003/10/03 05:16:25.289 | c:\online catalog\new name.htm | 3,763 | BUILTIN |
| 0000041 | 2003/10/13 05:02:34.304 | c:\online catalog\index.htm | 13,295 | BUILTIN |
| 0000040 | 2003/10/13 05:02:34.895 | c:\online catalog\downloadlist.htm | 5,593 | |
| 0000039 | 2003/10/13 04:23:06.094 | c:\online catalog\Copy of images\Velocity_19.gif | 1,497 | |
| 0000038 | 2003/10/13 04:21:16.094 | c:\online catalog\Copy of images\Velocity_18.gif | 7,032 | BUILTIN |
| 0000037 | 2003/10/13 04:23:06.094 | c:\online catalog\Copy of images\Velocity_2.gif | 7,383 | BUILTIN |
| 0000036 | 2003/10/13 04:23:06.094 | c:\online catalog\topedge.jpg | 688 | BUILTIN |
| 0000035 | 2003/10/13 04:47:09.374 | c:\online catalog\svboxlayoutsmall.jpg | 3,478 | BUILTIN |
| 0000034 | 2003/10/13 04:46:57.407 | c:\online catalog\spacer.gif | 43 | BUILTIN |

Ready    10/13/2003    12:17 PM

*Fig. 18*

File Comparison \config

\config
1 File Changes Found, 2 Attribute Changes Found

| Complete | Changes Only |
|---|---|

File Comparison

```
28    }
29  }
30  services {
31    ssh {
32      root-login allow;
33      protocol-version [ v2 v1 ];
34      connection-limit 13;
35    }
36    telnet;
37  }
38  }
39  interfaces {
40    fxp0 {
```

— 530

— 532

Attribute Comparison

| Attribute | Authoritative Copy Revision 0002 | Intrusion 0000001 (2003/10/13 13:11:29.000) |
|---|---|---|
| Hash Type | SHA1 | SHA1 |
| Digital Signature | 20a31c335ebfee7a364769aa22021864a6bd584d | 1dbae069f1adbe9bcaa6742852528c08eb9cd175 |
| File Size | 1529 | 1530 |
| Creation Time | 00/00/0 0:00:00 AM | 00/00/0 0:00:00 AM |
| Modify Time | 00/00/0 0:00:00 AM | 00/00/0 0:00:00 AM |

534 — 536

Legend

☐ Changed  ☐ Added  ☐ Deleted

[ Ok ]   [ Print ]

*Fig. 23*

SYSTEM AND METHOD FOR MAINTAINING SERVER DATA INTEGRITY

CROSS-REFERENCE TO RELATED APPLICATION

The present application is a continuation patent application of U.S. patent application Ser. No. 10/685,189 filed Oct. 14, 2003 now abandoned entitled SYSTEM AND METHOD FOR MAINTAINING SERVER DATA INTEGRITY which application claims the benefit of U.S. Provisional Application No. 60/418,003, filed Oct. 14, 2002, both of which are incorporated in their entirety.

TECHNICAL FIELD OF THE INVENTION

The invention generally relates to computer software and more specifically to a system and method for maintaining server data integrity.

BACKGROUND OF THE INVENTION

The content of servers such as those hosting Internet websites, or devices such as routers are often tampered with by hackers or viruses. In some cases, one or more files such as web pages are removed from the server, whereas in other cases, their content is modified. Present systems and methods are available to provide varying levels of protection to server or device content. In one example, the security system produces digital signatures of a web-site's content and once a day checks the files to see if the digital signature matches. If the digital signatures of the files do not match, then the system notifies a designated user such as an administrator that the site has been tampered with. However, the system does not repair or replace the file or files that were tampered with.

In another example, a software product fits between a web server and the Internet. Whenever a web user accesses content on the website under control of the software, the software checks the digital signatures of the pages being accessed to make sure they match with the digital signatures stored as the master for those files. If the digital signatures don't match, then the system displays a notice to the user indicating that the site is down or under repair. This approach ensures that web user does not see any content that was altered, but instead just receives a notification that the site is temporarily unavailable. In both of these scenarios, the problem is not resolved, but rather it is merely identified. A network or web-site administrator still has to deal with the efforts involved in restoring the site to its previous state, either from a backup tape or other similar methods.

The problem with the present systems and methods have created a need for a more robust system and method for maintaining server data integrity and restoring content that was altered. The present invention is directed toward meeting this need.

SUMMARY OF THE INVENTION

It is an object of the present invention to provide a computerized system and method for maintaining the integrity of a computer system. It is a further object of the present invention to provide a system and method for promptly repairing and restoring the content of a computer system that was tampered with.

These objects and others are achieved by various forms of the present invention. According to one aspect of the invention, a system for monitoring a computer system and detecting alterations in computer system's content is provided. According to another aspect of the invention, a system for disaster recovery of a computer system is provided.

The System Integrity Guardian (SIG) of the preferred embodiment of the present invention offers a solution to the problem of maintaining the integrity and non-repudiation of data. The System Integrity Guardian can protect any type of object, whether it be documents, databases, application program files, operating system files, web pages, directories, or device files or configurations.

The System Integrity Guardian has three (3) integrated software components, a Client component, a Monitor Agent component, and a Repository Server component. In one embodiment, each of these operates as an autonomous unit, but preferably is tightly integrated with each of the other components to offer the most flexible coverage of a computer system.

The Client component is the user interface for administering the System Integrity Guardian environment. Through this unit an administrator can determine which servers to protect, and which objects (directories and/or files) to protect (or not) within said server. Also with the Client component, the administrator can define what actions will be taken when an event that breaches integrity occurs. This can include a range of options from just logging the event up to quarantining the effected object(s) and then either removing any undesired object or replacing it with an authoritative copy from the Protected Object Central Repository. In addition, the Client interface can be used to define and view various computer system performance criteria such as CPU utilization, Bandwidth usage, Storage Statistics and the like. With such a rich supply of information available to it, the Client interface also offers a diverse array of reports to help an administrator to quickly surmise the condition and status of all computer systems being protected—without wasting precious time inspecting individual logs or multiple emails from each machine. In addition to this GUI interface, there is a Command Line Utility providing for non-graphical environments or Batch Processing.

The Monitor Agent component is the watchdog of the System Integrity Guardian. Its job is to capture and address any event that occurs on any object that is currently being protected. Each computer system/server being protected has a Monitor Agent component installed on the same or a separate computer as the object(s) being monitored. As one non-limiting example, a server such as a web server might have the Monitor Agent installed on the server itself, while a network device such as a router might be monitored from a separate server that has the Monitor Agent installed. Each of these Monitor Agents in turn communicates through an RC4 encrypted layer with the Repository Server component in order to authenticate and maintain the integrity of the computer system. This process is performed primarily on an as-needed basis. In one embodiment, the System Integrity Guardian offers three (3) modes of operation for detecting integrity events, Real-Time, Mixed-Mode and Polling Cycle. This offers a more efficient means of protecting a computer system by being continually available or aware, but not depleting value resources of the machine by running unnecessary scans and checks.

The Repository Server component of the System Integrity Guardian includes the server and the Protected Object Central Repository. It is here that the authoritative copies are maintained, digital signatures are created and stored, objects are validated and communication between the three units is performed. The Repository Server component interfaces with several other software components in order to perform its tasks. Included in these is the Protected Object Central Repository, the Quarantined Object Storage, the Repository Database, a WebTrends™ Data log, and various Email and Messaging interfaces.

Further forms, embodiments, objects, advantages, benefits, features, and aspects of the present invention will become apparent from the detailed description and drawings contained herein.

BRIEF DESCRIPTION OF THE DRAWINGS

FIG. 18 is a simulated screen of one embodiment showing a list of files that have been altered on a web catalog of a selected server.

FIG. 23 is a simulated screen of one embodiment showing a file comparison of a protected version of a file compared to an altered version of a file.

DETAILED DESCRIPTION OF SELECTED EMBODIMENTS

Figure 1:
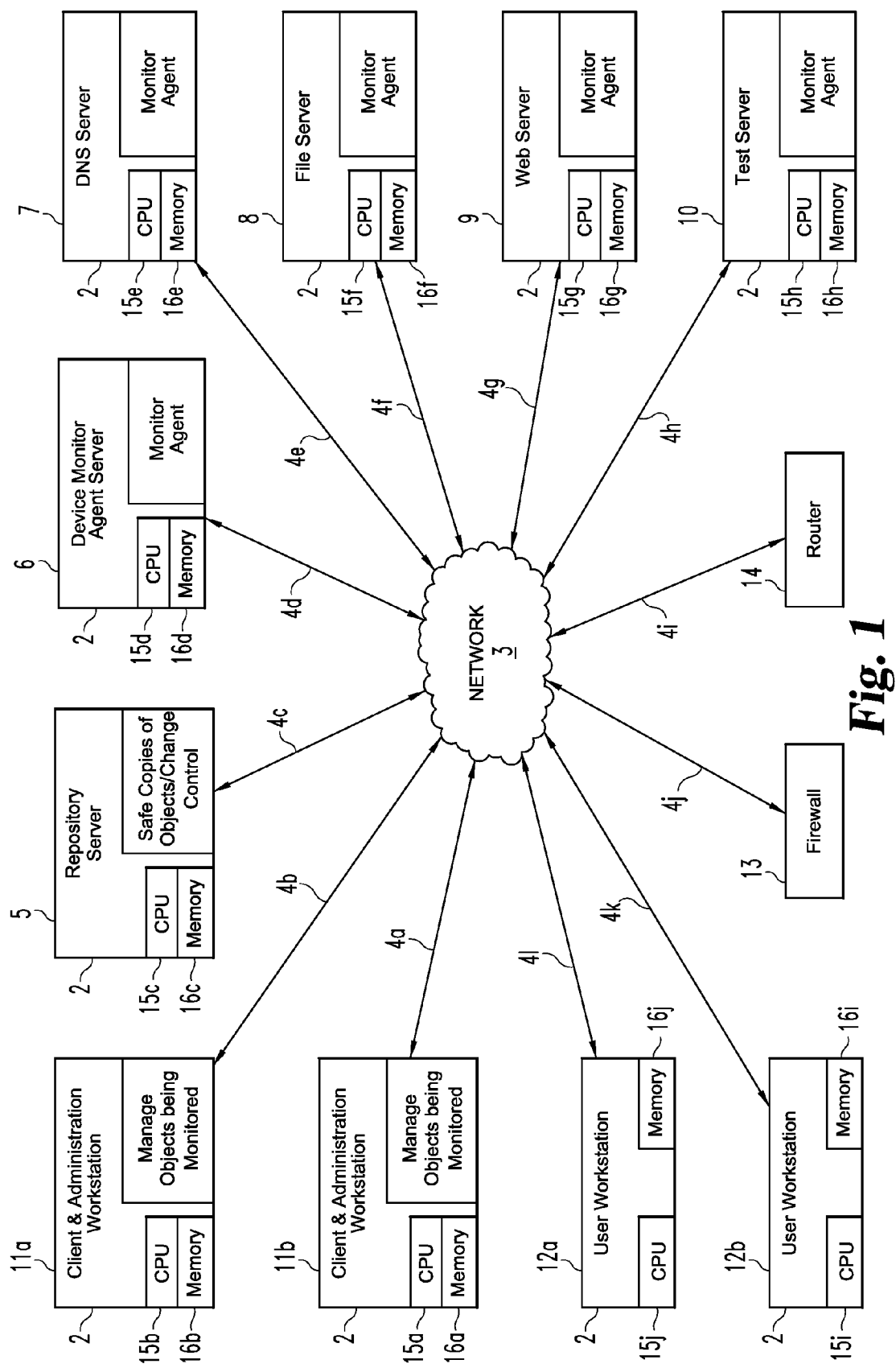
FIG. 1 is a diagrammatic view of a computer system of one embodiment of the present invention.
Figure 2:
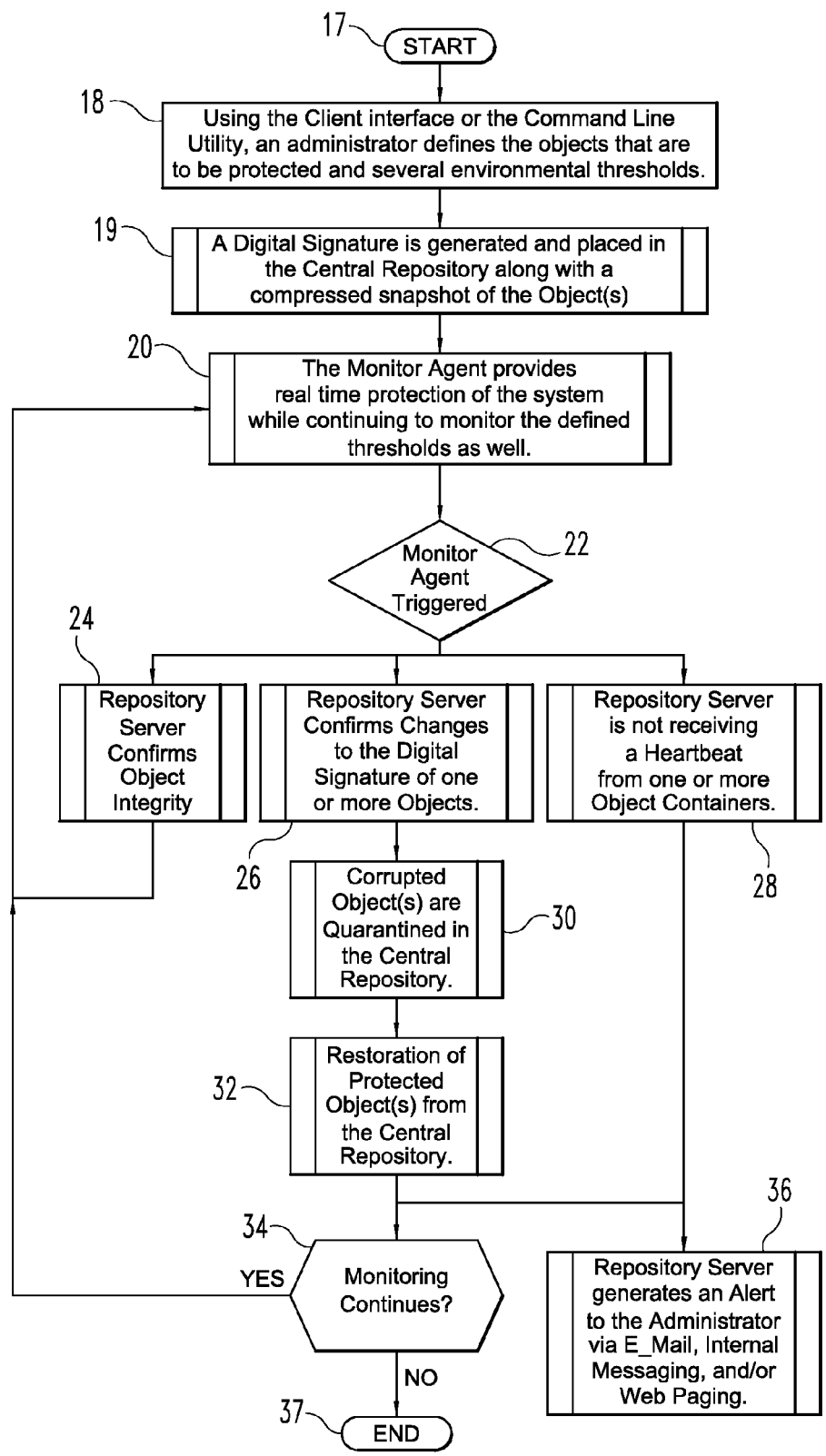
FIG. 2 is a schematic diagram of one embodiment, demonstrating the steps and processes involved in monitoring and repairing altered content.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

One embodiment of the present invention includes a unique system for maintaining integrity of files or data. FIG. 1 is a diagrammatic view of computer system 1 of one embodiment of the present invention. Computer system 1 includes computer network 3. Computer network 3 couples together a number of computers 2 and devices 13 and 14 over network pathways 4. More specifically, system 1 includes several servers, namely Repository Server 5, Device Monitor Agent Server 6, DNS Server 7, File Server 8, Web Server 9, and Test Server 10. System 1 also includes Firewall 13, Router 14, Client & Administration Workstations 11a and 11b, and User Workstations 12a and 12b. While computers 2 are illustrated as being a client or a server, it should be understood that any of computers 2 may be arranged to include both a client and server, just a client, or just a server. Furthermore, it should be understood that while ten computers 2 are illustrated, more or fewer may be utilized in alternative embodiments.

Computers 2 include one or more processors or CPUs ($15a$, $15b$, $15c$, $15d$, $15e$, $15f$, $15g$, $15h$, $15i$, and $15j$, respectively) and one or more types of memory ($16a$, $16b$, $16c$, $16d$, $16e$, $16f$, $16g$, $16h$, $16i$, and $16j$, respectively). Each memory $16a$, $16b$, $16c$, $16d$, $16e$, $16f$, $16g$, $16h$, $16i$, and $16j$ includes a removable memory device, which is not shown to preserve clarity. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or otherwise) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD); a magnetically encoded hard disc, floppy disc, tape, or cartridge media; or a combination of any of these memory types. Also, each memory may be volatile, nonvolatile, or a hybrid combination of volatile and nonvolatile varieties. Although not shown to preserve clarity, network devices such as Firewall 13 and Router 14 can also include one or more types of memory, such as those that store device configurations.

Computer network 3 can be in the form of a Local Area Network (LAN), Municipal Area Network (MAN), Wide Area Network (WAN), such as the Internet, a combination of these, or such other network arrangement as would occur to those skilled in the art. The operating logic of system 1 can be embodied in signals transmitted over network 3, in programming instructions, dedicated hardware, or a combination of these. It should be understood that more or fewer computers 2 can be coupled together by computer network 3.

In one embodiment, system 1 operates as a data integrity system at one or more physical locations with Repository Server 5 being configured as a server for maintaining safe copies of objects and managing change control to those objects, Device Monitor Agent Server 6 being configured as a server with a monitor agent for monitoring network device data integrity of devices such as Firewall 13 and Router 14, and the remaining servers (DNS Server 7, File Server 8, Web Server 9, and Test Server 10) being configured as their respective server type and having a monitor agent to monitor data integrity. It should be understood by one in the computer software art that various other server arrangements are possible, such as one or more servers acting as both a File Server and a Web Server, one or more servers acting as both a Repository Server and a Monitor Agent Server, to name a few non-limiting examples. Various other server types could be present, and some of the server types shown in system 1 could be missing, and still be within the spirit of the invention.

User Workstations 12a and 12b are used by end users for various purposes. Client & Administration Workstations 11a and 11b can be used to view and manage the objects being controlled by Repository Server 5 and being monitored by the Monitoring Agents of Servers 6, 7, 8, 9, and 10. Typically applications of system 1 would include many more User Workstations 12a and 12b, and/or many more Client & Administration Workstations 11a and 11b, at one or more physical locations, but only a few have been illustrated in FIG. 1 to preserve clarity.

System 1 can be used for various purposes where maintaining and protecting objects is useful. Some non-limiting examples include file/data integrity, disaster recovery, business continuity, automatically loading software onto multiple machines, monitoring server farms, monitoring DNS servers, monitoring static databases, monitoring database or application executables and/or configuration files, configuration management, patch management, and/or provisioning of wireless devices.

One embodiment for implementation with system 1 is illustrated in flow chart form as procedure 17, which demonstrates a high level process for maintaining data integrity on computers, and/or on devices such as switches, routers, and firewalls. In one form, procedure 17 is at least partially implemented in the operating logic of system 1. Procedure 17 begins with a user using a Client & Administration graphical or command line utility to define 17 the objects to be protected and several environmental thresholds to be monitored. A unique digital signature is generated 19 and placed in the Central Repository along with a compressed snapshot of the object(s). The digital signature can be an MD5, SHA1, or other type of digital signature or unique identifier, as a few non-limiting examples.

The Monitor Agent Component begins monitoring 20 the system in real time. If the monitor is triggered 22, the Repository Server attempts to confirm object integrity 24. If the Repository Server confirms changes to the digital signature of one or more objects 26, the corrupted objects are quarantined in the Central Repository 30 and the protected objects are then restored from the Central Repository 32. If the Repository Server is not receiving 28 a heartbeat from one or more object containers, the Repository Server generates an alert 36 to the administrator. As monitoring continues 34, the process repeats by Monitor Agent continuing to provide real-time protection 20.

The Monitor Agent Component

Figure 3:
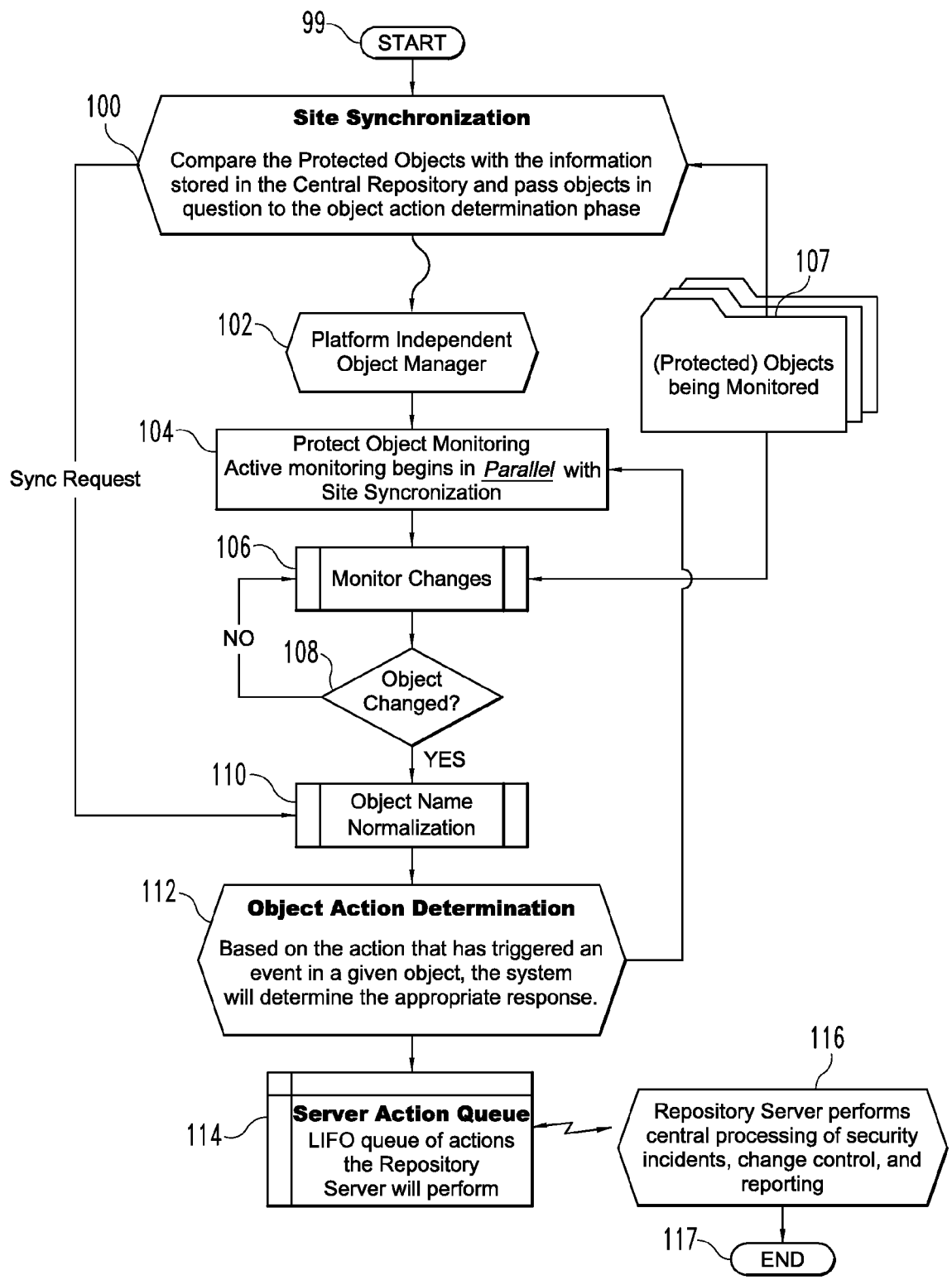
FIG. 3 is a schematic diagram of a monitoring component of one embodiment, demonstrating the steps and processes involved with monitoring the website in real time.

Referring now to FIG. 3, procedure 99 demonstrates a process for synchronizing and monitoring objects. In one form, procedure 99 is at least partially implemented in the operating logic of system 1. The Monitor Agent component is initiated using a layer known as the "Platform Independent Object Manager" 102. Once the Monitor Agent has determined the operating parameters it initiates parallel threads for "Site Synchronization" 100 and Active Monitoring 104.

While monitoring the system 106, the protected objects are being watched 107 for any type of change event 108 including modifying, renaming, moving, adding or deleting objects. If any of these events occur, the Monitor Agent responds by first Normalizing 110 the name of the effected objects. This normalization translates an object's name into a form that is recognizable by the Repository Server component regardless of its host platform. Having normalized the names, the "Object Action Determination" is triggered 112 to determine the appropriate course of action to take. As a few non-limiting examples, added objects will be removed, modified objects will be replaced, and deleted objects will be restored. The corresponding action message is then placed in the Server Action Queue 114 and the Repository Server component is triggered 116 to process the request.

Platform Independent Object Manager

Figure 4:
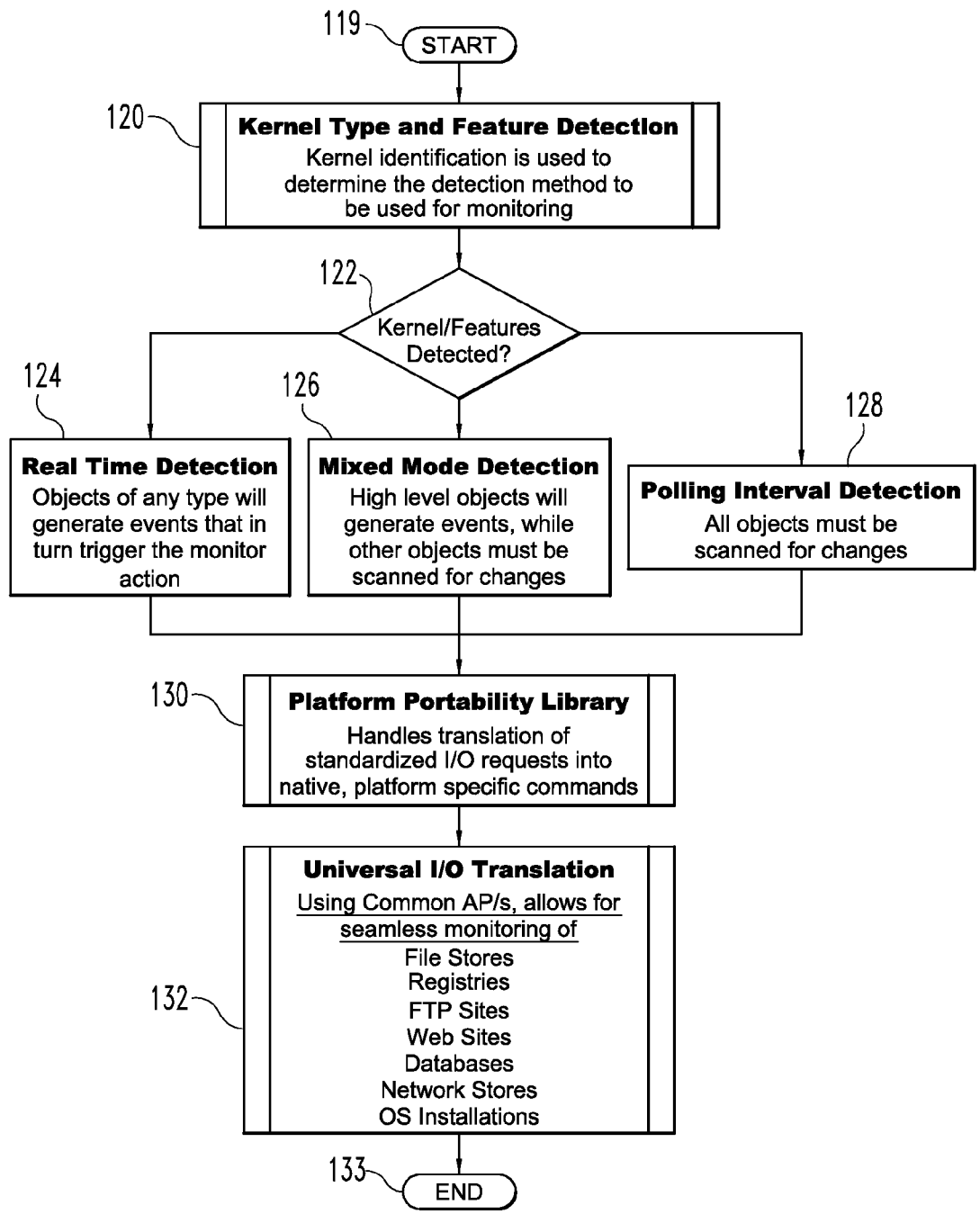
FIG. 4 is a schematic diagram of a platform independent object manager of one embodiment, demonstrating the steps and processes involved in monitoring objects on different platforms.

As shown in FIG. 4, procedure 119 illustrates the Platform Independent Object Manager layer that is used to establish three (3) primary elements that control the remaining functionality path of the Monitor Agent: "Kernel Type and Feature Detection", "Platform Portability Library", and "Universal I/O Translation". In one form, procedure 119 is at least partially implemented in the operating logic of system 1. Kernel Type and Feature Detection 120 determines the monitoring mode 122 to use based on the Platform, Operating System and specific Kernel in use.

In Real-Time Mode 124, the Monitor Agent is able to react to any event that happens on each individual object. This is of course the fastest and most accurate means of monitoring a system. In Mixed Detection Mode 126, high level objects such as Tree or Directory Objects are able to trigger an event in real-time, and then the Monitor Agent will scan children of the object to determine which object(s) have actually been tampered with. In Polling Interval Detection Mode 128, all objects are scanned at a predefined interval in order to verify that they are authentic.

Platform Portability Library 130 translates all standardized I/O requests into native platform specific commands. This layer provides seamless portability between operating platforms.

Universal I/O Translation 132 is used to provide common APIs for the monitoring of multiple Container types including File Stores, Registries, FTP Sites, Web Sites, Databases, Network Stores, and OS Installations.

Site Synchronization

Figure 5:
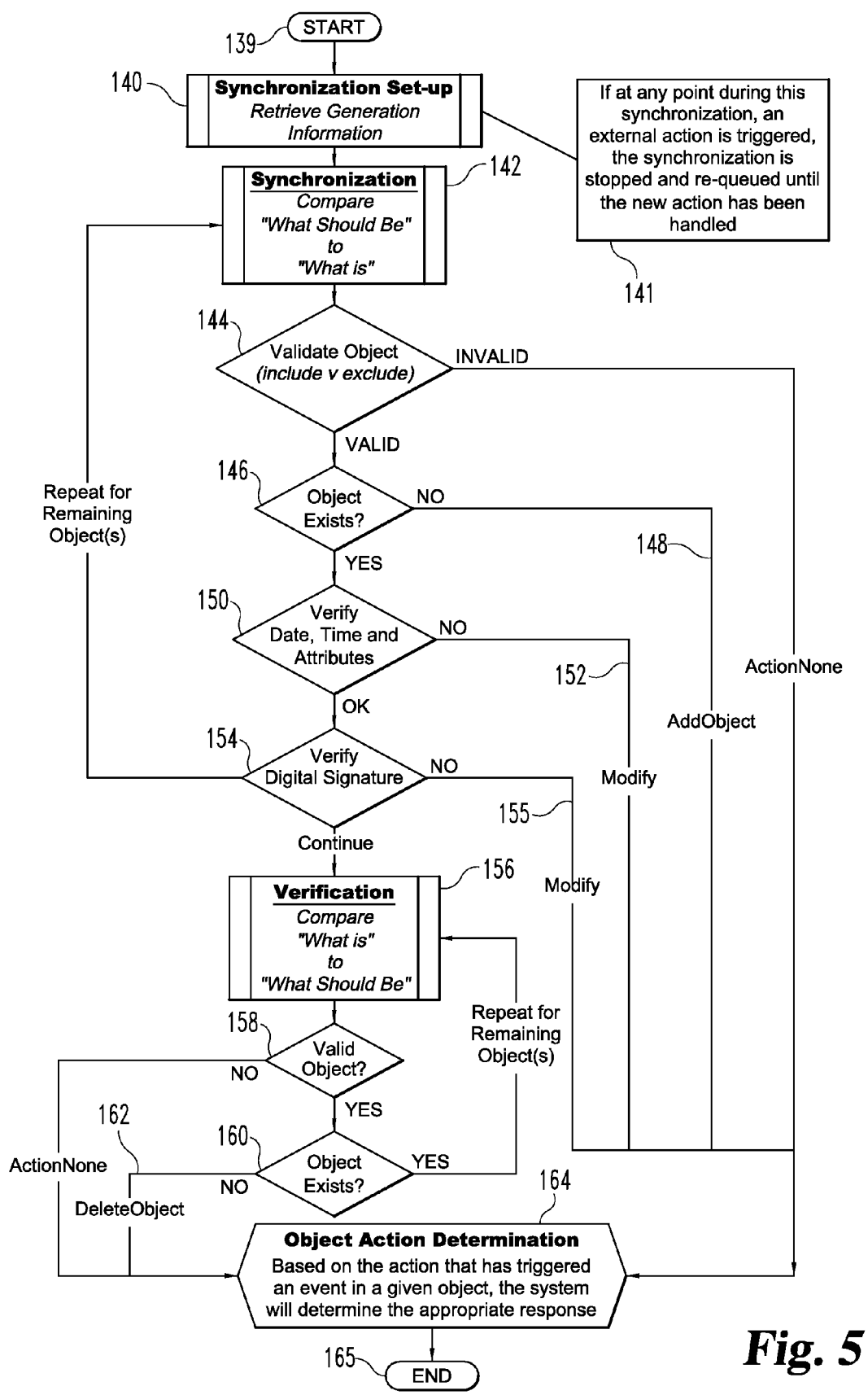
FIG. 5 is a schematic diagram of a site synchronization component of one embodiment, demonstrating the steps and processes involved in comparing the stored baseline of the protected objects against the actual protected objects.

As shown in FIG. 5, procedure 139 illustrates the Site Synchronization process which is responsible for comparing the stored baseline of the protected objects against the actual protected objects. In one form, procedure 139 is at least partially implemented in the operating logic of system 1. The Site Synchronization process is accomplished in two phases, Synchronization and Verification.

After Synchronization set-up 140, Synchronization performs a comparison 142 between Stored Authoritative Copy (SAC) in the Protected Object Central Repository with the actual object that is being protected. First, the Monitor Agent determines 144 if the object is an "included" object in the protected group or container. If so, the Monitor Agent verifies that the object physically exists 146. If it does not, an "AddObject" message is sent 148 to Object Action Determination 164. If the object does exist, the stored attributes of the object, such as size, date and time, are compared 150 to the physical attributes. If these do not match, a "Modify" message is sent 152 to Object Action Determination 164. Otherwise, the stored digital signature is compared 154 against the physical digital signature. If the digital signature fails, a "Modify" message is also sent 155 to Object Action Determination 164. Once any requested objects are processed, the Verification phase begins 156.

Verification is the reverse comparison of the Synchronization phase. Each object that physically exists is compared against the SAC. If the physical object's container is supposed to be monitored 158, the Monitor Agent then verifies that the physical object exists in the SAC 160. If an object is not found to have a matching SAC, a "DeleteObject" message is sent 162 to Object Action Determination 164.

If at any time during Site Synchronization another Integrity-Compromising Event is fired by the active monitoring thread, the Site Synchronization is stopped, and re-queued for reprocessing 141.

Object Action Determination

Figure 6:
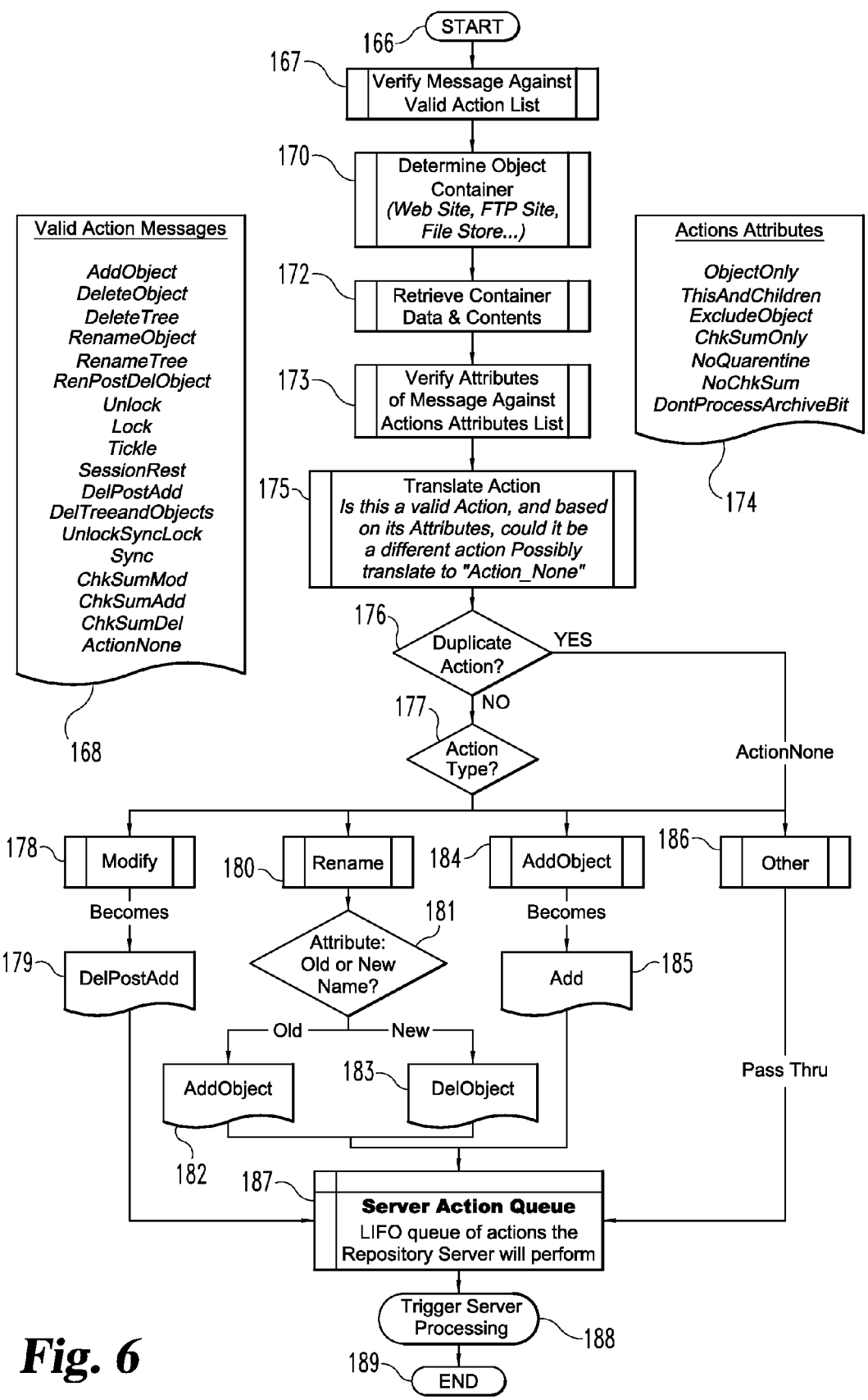
FIG. 6 is a schematic diagram of an object action determination component of one embodiment, demonstrating the steps and processes involved in receiving messages from the monitor agent and passing them to the repository server.

When monitoring a large number of objects, it is possible for a single integrity-compromising event to generate many messages. As shown in FIG. 6, procedure 166 illustrates the Object Action Determination (OAD) process which reduces the number of messages to be processed in order to accomplish the same goal. In one form, procedure 166 is at least partially implemented in the operating logic of system 1. Messages from the Monitor Agent to the Repository Server are passed through the OAD. First, each message is verified 167 against the Valid Message list 168. Once a message is determined 170 to be a valid message for the Container Type being monitored. 172, the attributes 174 of the message are verified. Now that the message and its attributes are known to be valid 175, the Action Queue is searched for an existing action so as to discard any duplicates 176. Lastly, certain actions are translated into a series of actions or a more fitting action 177 based on its attributes or on actions already queued. Here are some non-limiting examples. If the action type is Modify 178, it is translated to DelPostAdd 179. If the action type is Rename 180, and the attribute had an old name, it is translated to AddObject 182. If the action type is Rename 180, and the attribute had a new name, it is translated to DelObject 183. If the action type is AddObject 184, it is translated to Add 185. Other actions 186 are passed through. These new, translated actions are then resubmitted to the Server Action Queue 187 and server processing is triggered 188.

The Repository Server Component

Figure 7:
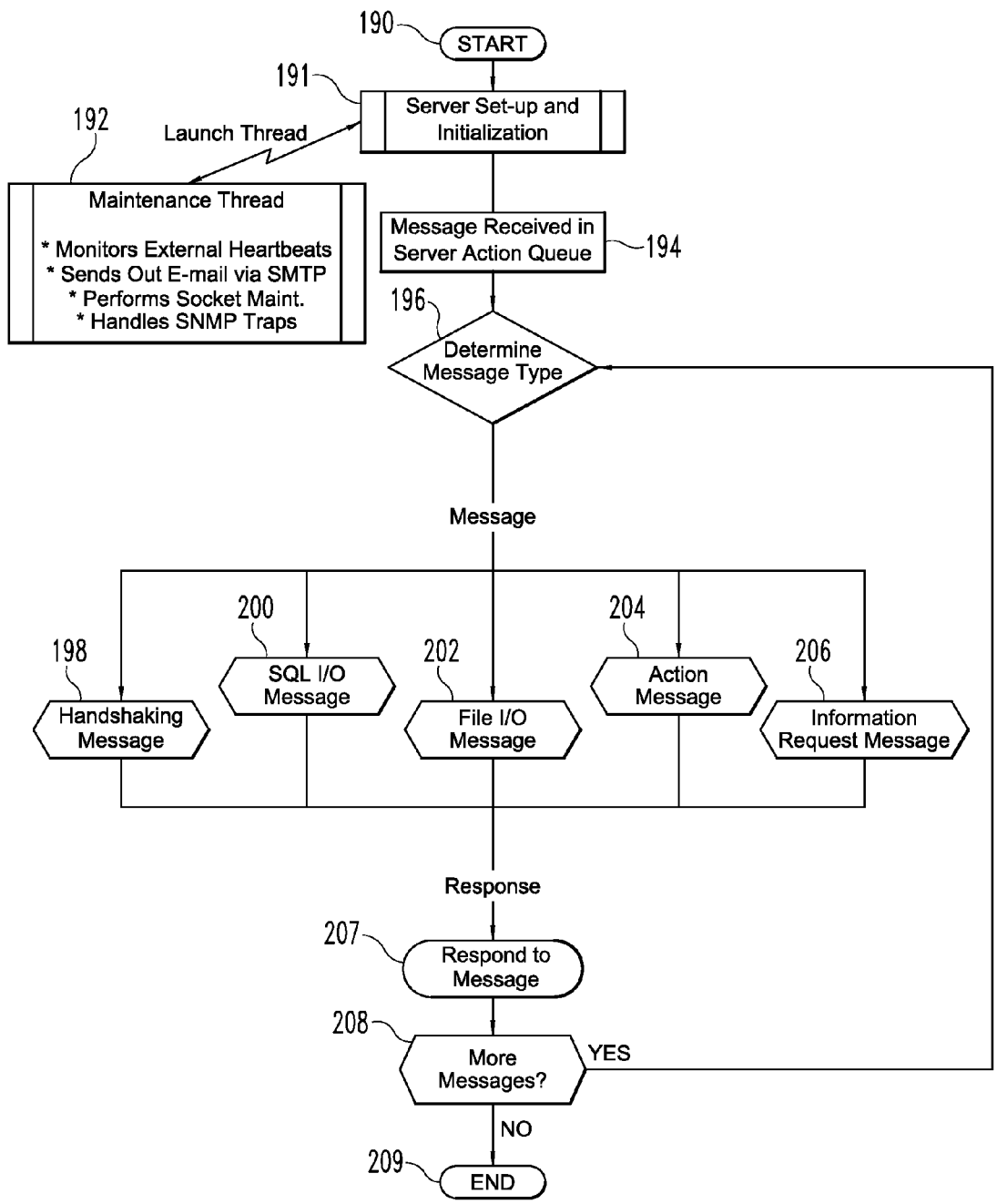
FIG. 7 is a schematic diagram of a system integrity server of one embodiment, demonstrating the steps and processes involved in receiving and processing messages.

As shown in FIG. 7, procedure 190 illustrates the steps involved in receiving and processing messages. In one form, procedure 190 is at least partially implemented in the operating logic of system 1. Upon initialization of the Repository Server component 191, a Maintenance thread is launched 192 to perform much of the extraneous processing that is necessary throughout the life of the Repository Server. This Maintenance thread is responsible for monitoring the "heartbeat" of the any functioning Monitor Agent components, sending of any SMTP Emails, Socket Maintenance, or SNMP Traps. Having launched this thread, the Repository Server awaits notification that there is a new message in the Action Queue to process 194.

In one embodiment, the Repository Server is capable of determining 196 and processing five (5) categories of messages, "Handshaking" 198, "SQL I/O" 200, "File I/O" 202, "Action" 204, and "Informational Request" 206. Other variations are also possible. After determining the message type 196, a response to the message 207 is provided. The process repeats for each of the messages 208.

Figure 8:
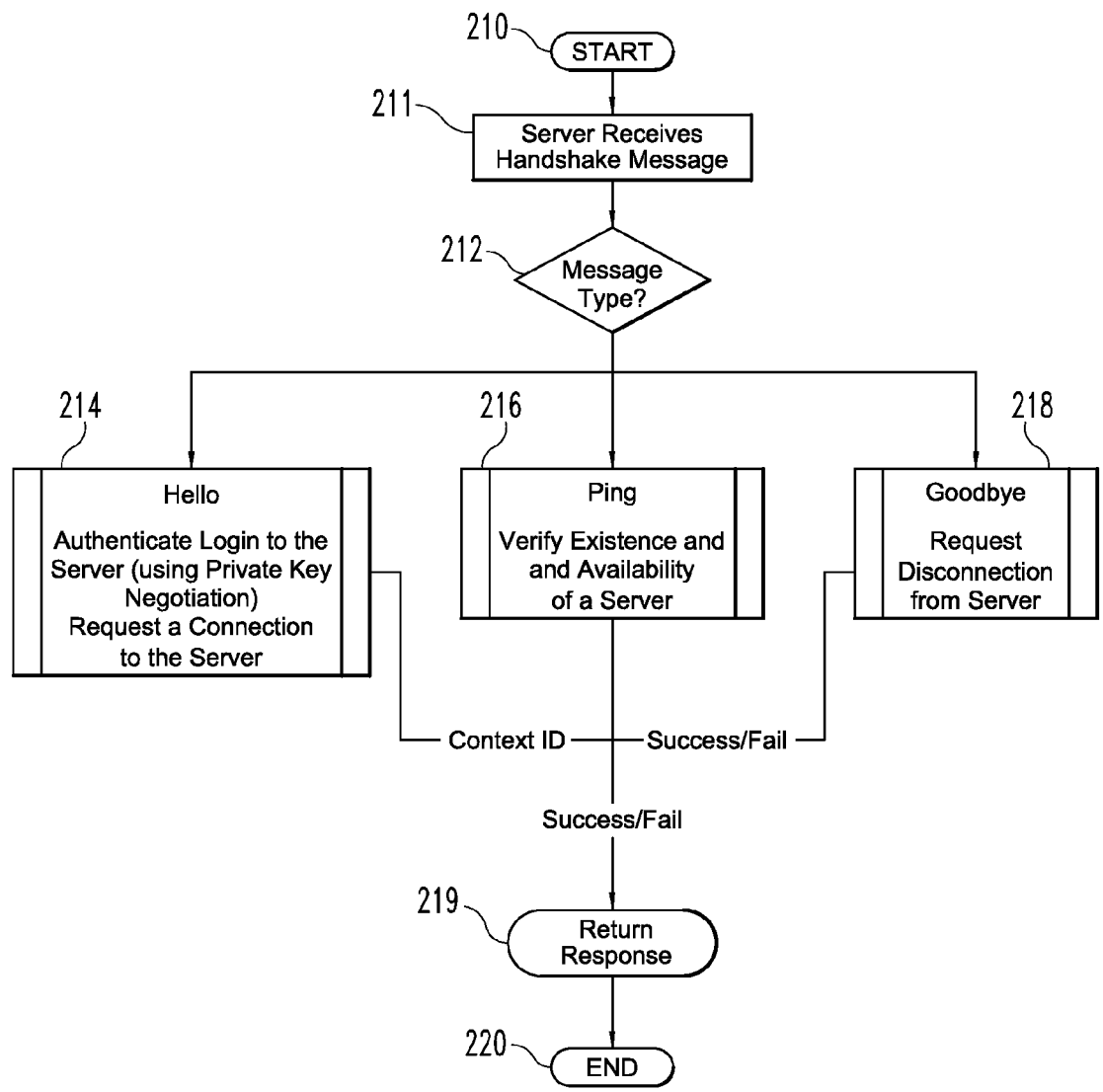
FIG. 8 is a schematic diagram of a server handshaking component of one embodiment, demonstrating the steps and processes involved with receiving and processing a handshake message.

Continuing with FIG. 8, procedure 210 illustrates how the Repository Server processes a handshake message. In one form, procedure 210 is at least partially implemented in the operating logic of system 1. Handshaking messages 210 are used for establishing connections to the Repository Server by authenticating logins 214, such as using Private Key Negotiation, and for Disconnecting 218 a connection from a Repository Server. These messages also provide the ability to "ping" 216 a server in order to verify the existence and availability of a server. After processing the message, a response is returned 219.

Figure 9:
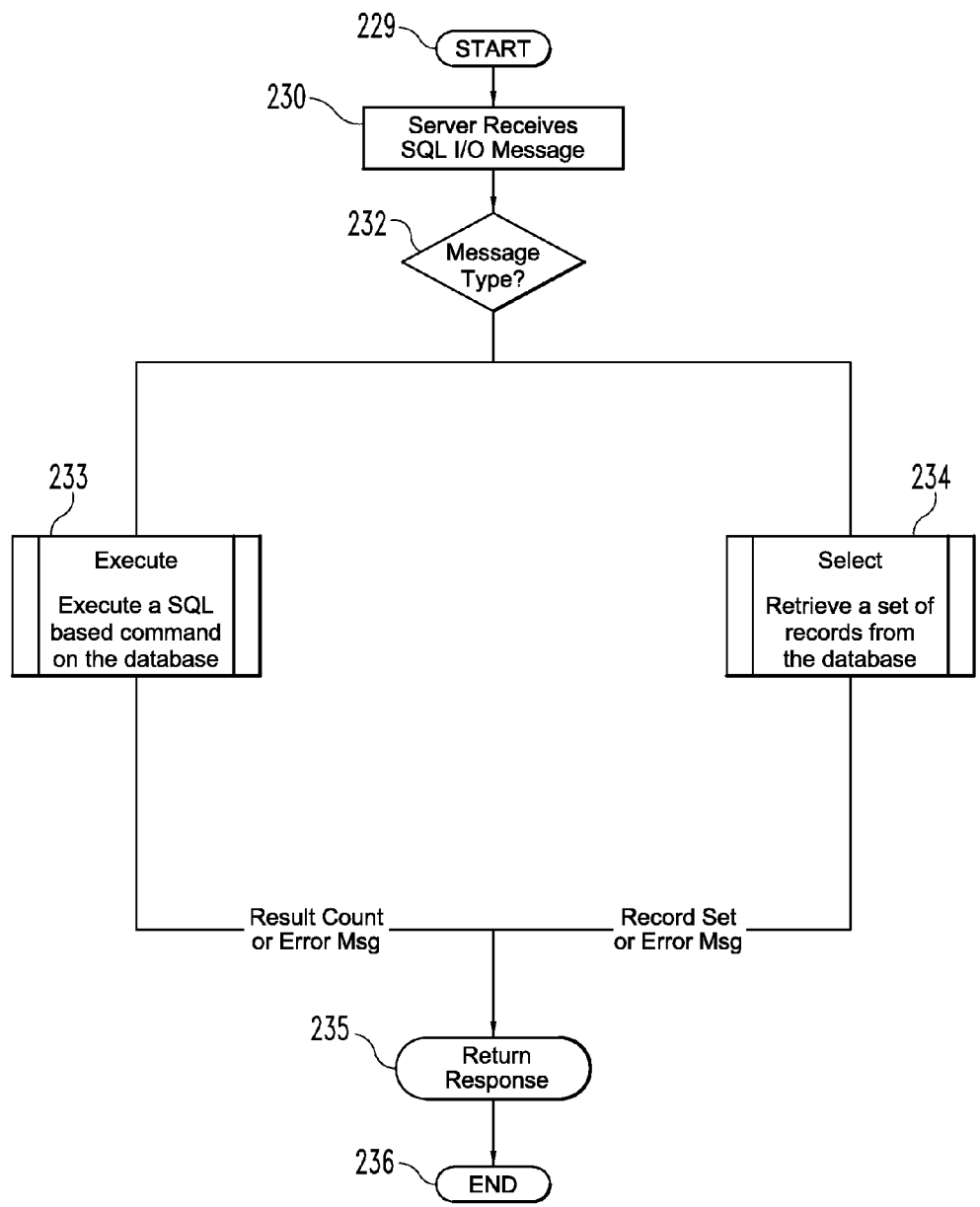
FIG. 9 is a schematic diagram of a server SQL input/output (I/O) component of one embodiment, demonstrating the sets and processes involved in processing a SQL I/O message.

Continuing with FIG. 9, procedure 229 illustrates how the Repository Server processes a SQL I/O message. In one form, procedure 229 is at least partially implemented in the operating logic of system 1. SQL I/O messages 230 provide a universal interface for whatever type of Repository Database is in use. This allows the Repository Server access to a Repository Database on any platform supporting TCP/IP. In one embodiment, two (2) forms 232 of this message are available, Execute 233 and Select 234. After executing the Execute 233 message type, a result count or an error message is generated. After executing a Select 234, a record set or error message is generated. After processing the message, a response is returned 235.

File I/O messages are used for all access to the Protected Object Central Repository. As shown on FIGS. 10A-10B, procedure 237 illustrates how the Repository Server processes File I/O messages. In one form, procedure 237 is at least partially implemented in the operating logic of system 1. File I/O messages are received by the repository server 238 and in one embodiment can be in one of four types 239: Uploads 240, Downloads 262, Deletes 290, and Moves 296.

Figure 10A:
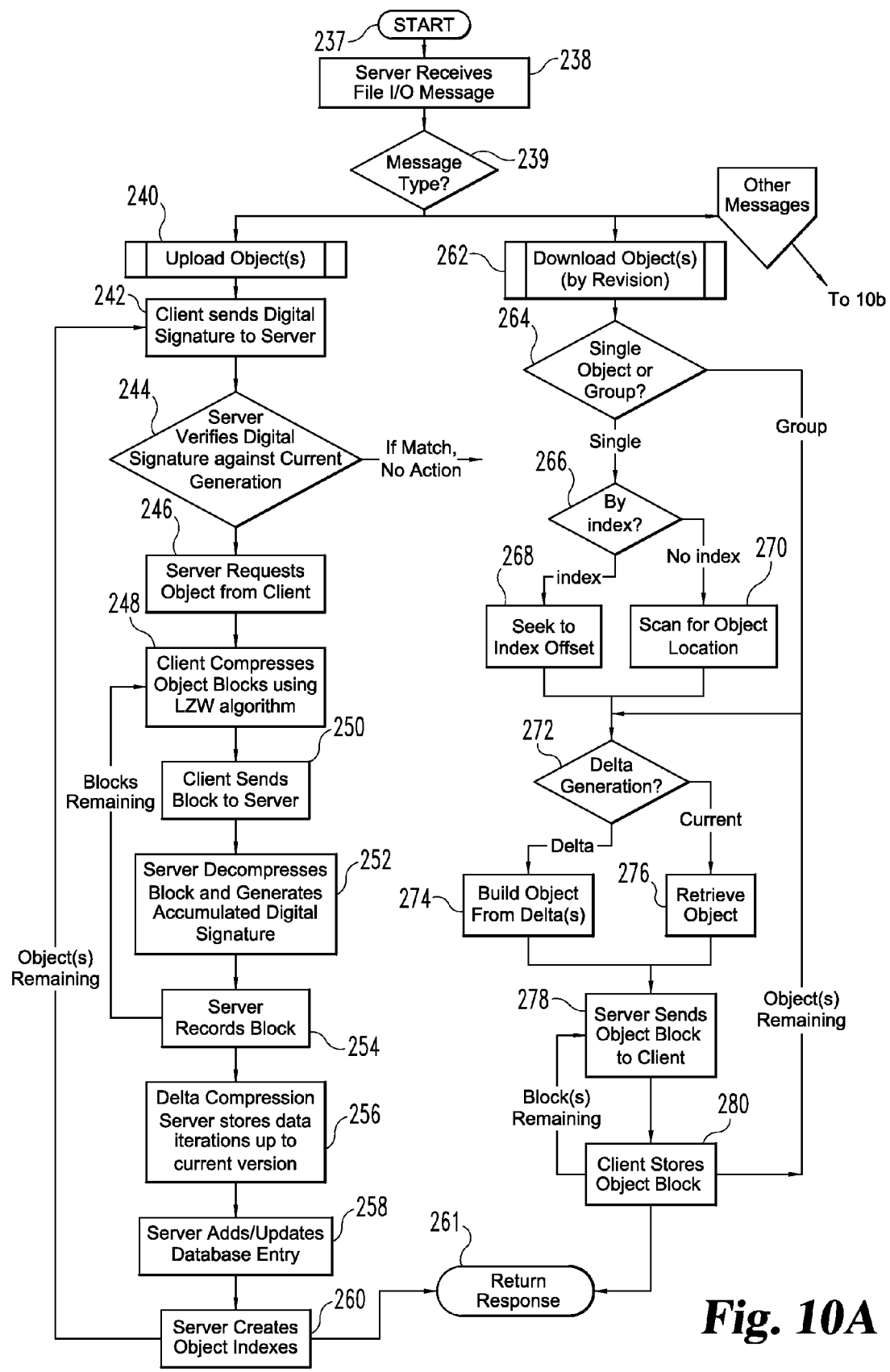
FIG. 10a is a schematic diagram of a first portion of a server file input/output (I/O) component of one embodiment, demonstrating the steps and processes involved in processing file I/O messages.

As shown in FIG. 10A, with the Upload message type 240, the client sends the Digital Signature of a given object to the Repository Server 242. This Digital Signature is verified 244 against the SAC's Digital Signature. Once confirmed as different, the Repository Server requests 246 that the Client transmits the object. Having received the transmit request, the Client separates the object(s) into multiple Blocks that are compressed 248 using an LZW lossless compression algorithm. Each Block in turn is transmitted 250 to the Repository Server. Upon receipt, the Repository Server decompresses 252 the block and generates an accumulated Digital Signature and records 254 this block to disk. Once all of the blocks are received and the accumulated digital signature is verified, the Repository Server generates 256 a "Delta Compression" of the object(s). This Delta Compression is a copy of the most recent generation, and only the differences of the previous generation. Lastly, the Repository Server updates 258 the data in the Repository Database and creates 260 the appropriate Object Indexes.

With the Download message type 262, there are twoforms of downloads, "Single Object" and "Object Group" 264. In the case of a single object request 266, the requestor can also specify an object index to aid in the location and retrieval of the object 268. If no index is provided, the Repository Server must do a sequential scan 270 to locate the specified object in the requested generation. Having determined the requested object, or in the event that an entire group is requested, the Repository Server continues 272. If the requestor is downloading the object from a previous generation, the current generation is regressed 274 using the Delta Compression data until the proper generation is achieved. If the requestor is downloading the object from the current generation, the object is retrieved 276. Having located the object in the desired generation, the Repository Server separates the object into LZW compressed blocks and transmits them to the Requestor 278. Once the requestor has received all of the blocks, they are reassembled into the object 280.

Figure 10B:
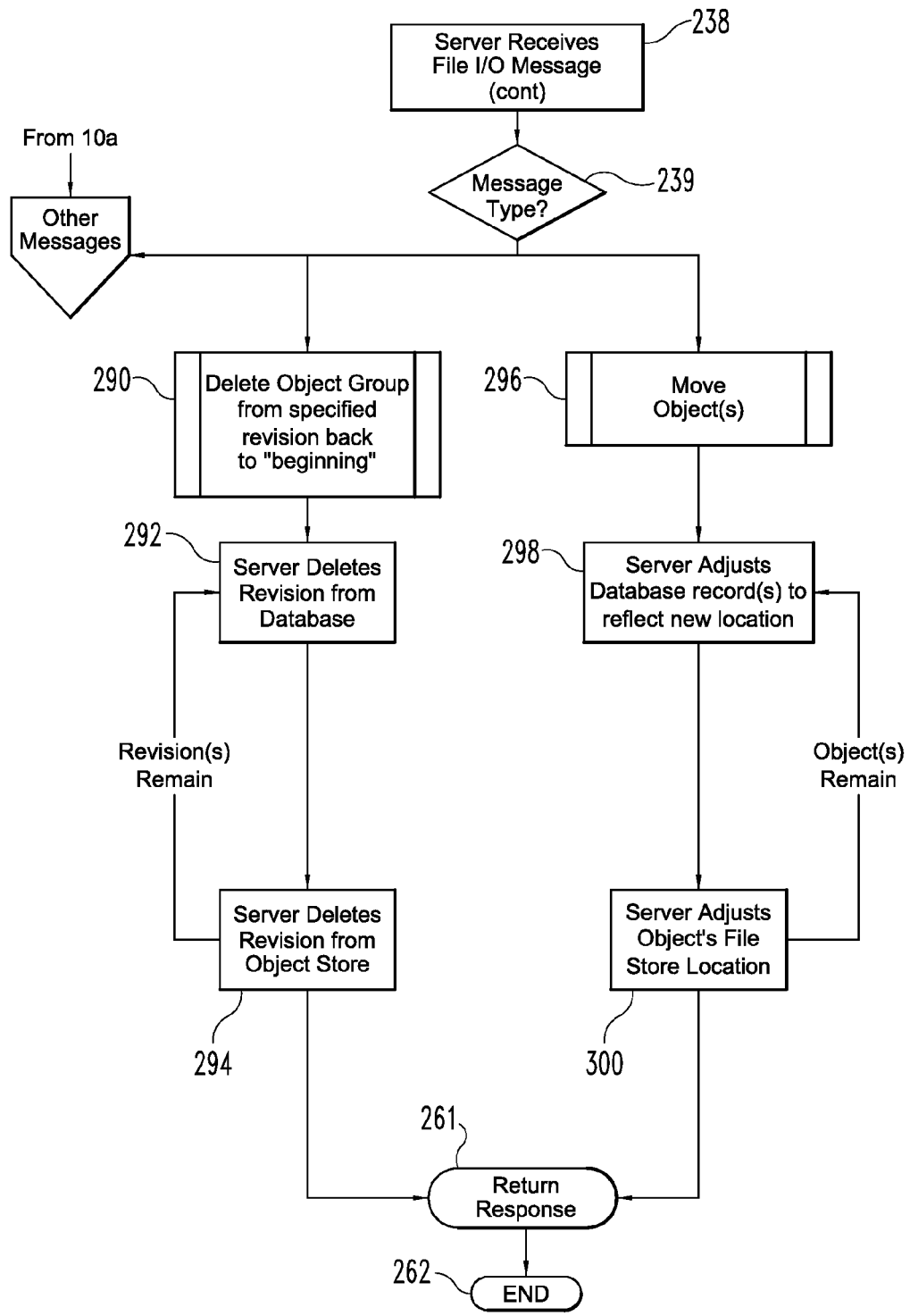
FIG. 10b is a schematic diagram of a second portion of a server file input/output (I/O) component of one embodiment, demonstrating the steps and processes involved in processing file I/O messages.

As shown in FIG. 10B, with the Delete message type 290, the message deletes a given group of objects starting at the specified generation 292 and recursively deleting generations until it reaches the oldest generation stored 294. This delete occurs both in the repository database and in the Protected Object Central Repository.

With the Move message type 296, the message is used to physically relocate 300 a given object within the Protected Object Central Repository and then update the corresponding database entries 298.

After processing the file I/O message based on the File I/O message type, a response is returned 261.

Figure 11:
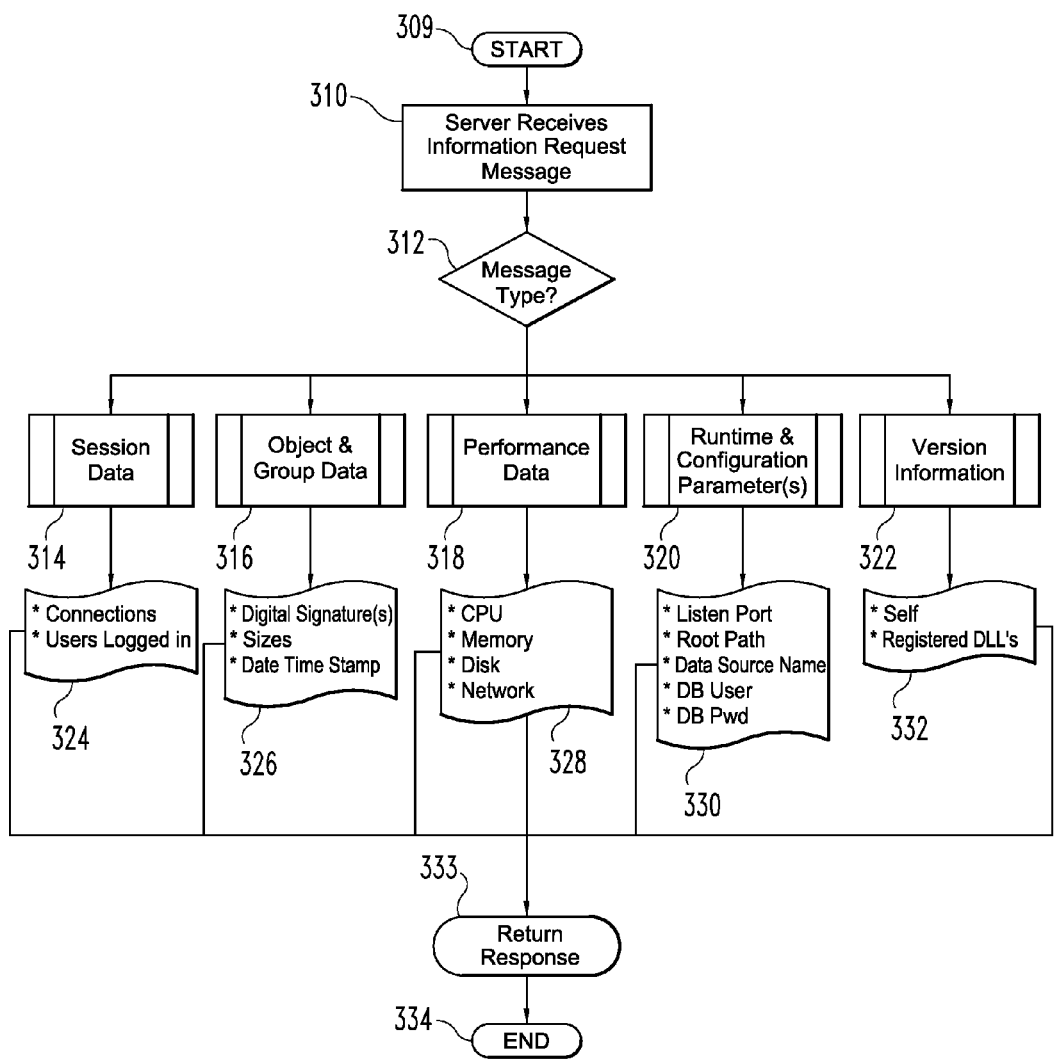
FIG. 11 is a schematic diagram of a server informational component of one embodiment, demonstrating the steps and processes involved in processing an information request message.

Continuing with FIG. 11, procedure 309 illustrates how Repository Server processes an Information Request Message. In one form, procedure 309 is at least partially implemented in the operating logic of system 1. Information Request Message provides access to various operation data on the Repository Server. In one embodiment, Repository Server can receive information request messages 310 in one of five (5) message categories: "Session Data" 314, "Object & Group Data" 316, "Performance Data" 318, "Runtime and Configuration Parameters" 320, and "Version Information" 322. Other variations are also possible.

- Session Data 314 allows retrieval of connection statistics and User information 324.
- Object & Group Data 316 allows retrieval of for Digital Signatures or object attributes (i.e.: size, data and time stamp) 326
- Performance Data 318 allows retrieval of the performance attributes 328 for a given machine, including CPU Utilization, Network Bandwidth, Memory Usage and Disk PO.
- Runtime and Configuration Parameters 320 establish 330 certain initialization parameters. For example, Listen Port, Root Path, Data Source Name, Database User, and Database Password.
- Version Information 322 include requests 332 specific to the Repository Server itself, including Version, and Registered DLLs.

After the Repository Server processes the Information Request Message, a response is returned 333.

Figure 12:
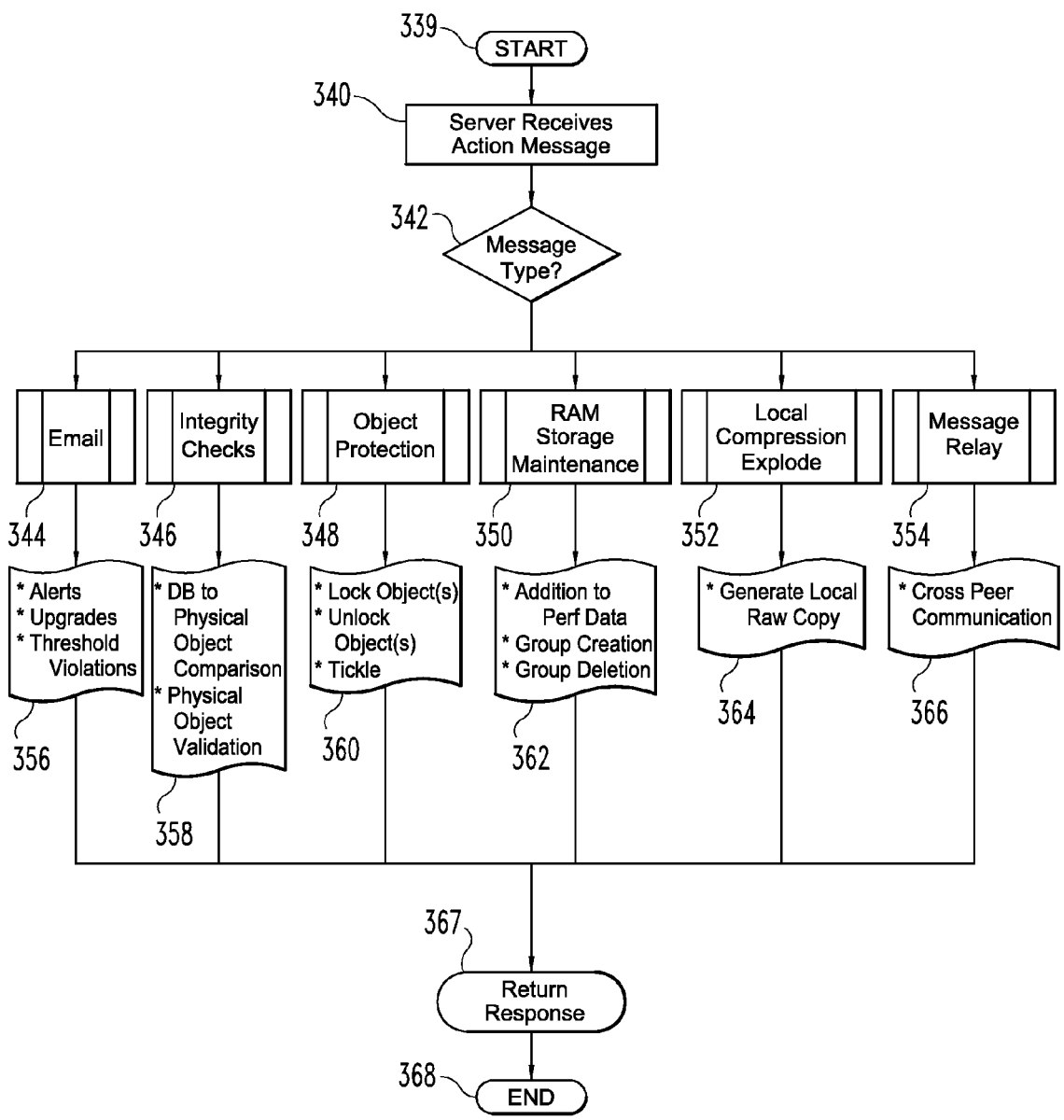
FIG. 12 is a schematic diagram of a server action component of one embodiment, demonstrating the steps and processes involved in processing an action message.

Continuing with FIG. 12, procedure 339 illustrates how Repository Server processes an Action Message. In one form, procedure 339 is at least partially implemented in the operating logic of system 1. Action messages are used to request that the Repository Server perform a given function 340. In one embodiment, valid action messages are separated into six (6) general categories 342, "Email" 344, "Integrity Checks" 346, "Object Protection" 348, "RAM Storage Maintenance" 350, "Local Compression Explode" 352, and "Message Relay" 354.

- Email 344—All email type communications are handled 356 here, including Alerts, Upgrades, and Threshold Violation Notices.
- Integrity Checks 346—These messages are used 358 for spot-checking the Repository Server and the Protected Object Central Repository for any potential corruption of the data or indexes.
- Object Protection 348—This collection 360 is one of the most used message categories in the Repository Server. It is from here that objects and object group can be Locked and UnLocked. Also included in this set is a "Refresh" message used to request that the Repository Server refresh the information that is in RAM with information from the Protected Object Central Repository and Repository Database.
- RAM Storage Maintenance 350—While running, the Repository Server maintains 362 a memory copy of various operating parameters and performance statistics to monitor. This message group is used in the defining, modifying, and deleting of these parameters.
- Local Compression Explode 352—In order to generate 364 a local disk based copy of a given object on the Repository Server, a "Local Compression Explode" is used.
- Message Relay 354—These messages are tailored to distributing 366 communications between peers within the system. It is often necessary for the client to communicate with another agent in the course of operation. These relay messages allow for this peer-to-peer communication to take place.

After the Repository Server processes the Action Message, a response is returned 367.

Protected Object Central Repository

Figure 13:
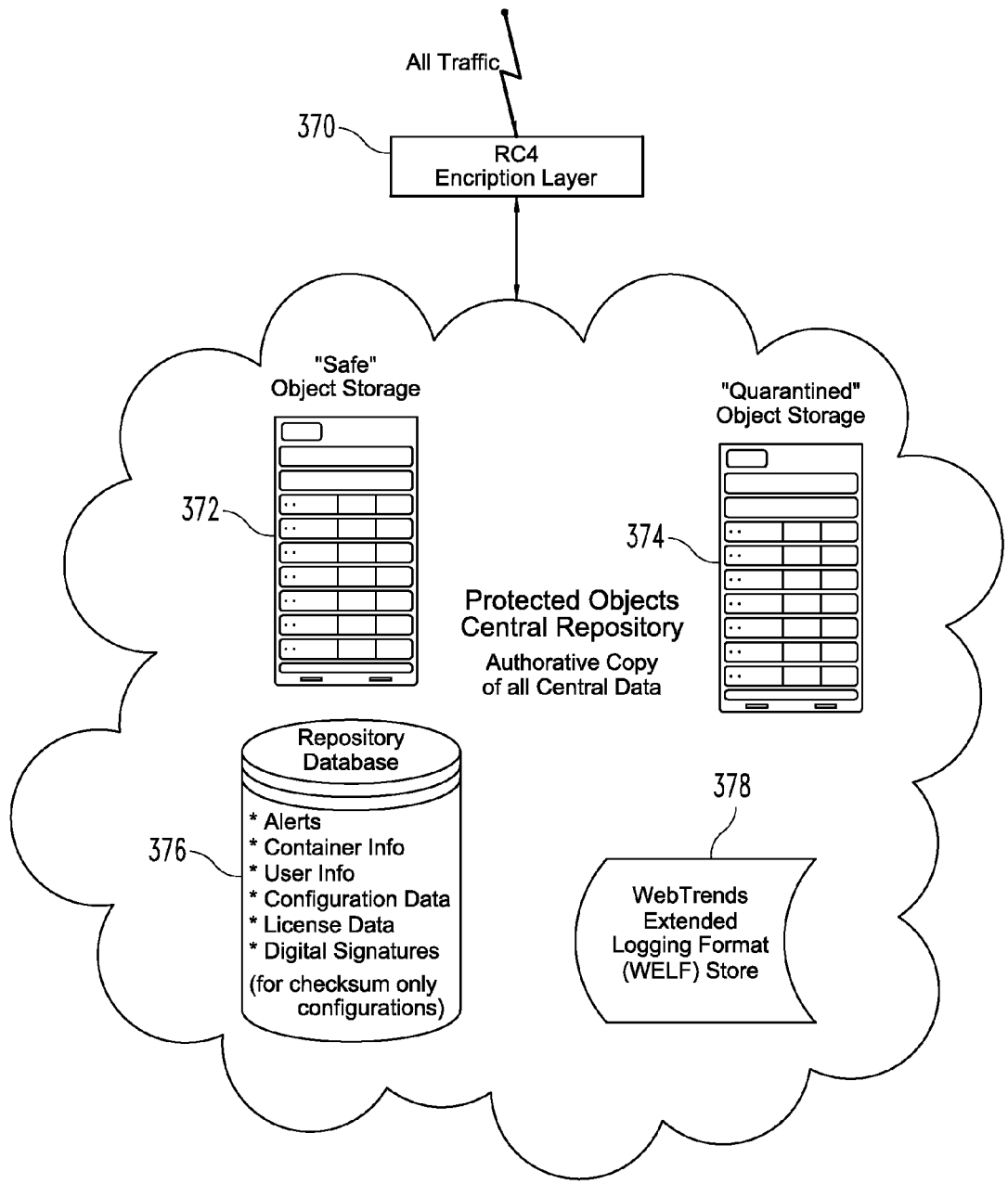
FIG. 13 is a schematic diagram of a repository component of one embodiment, illustrating the components of the protected objects central repository.

Continuing with FIG. 13, the Protected Object Central Repository is the storage center of the System Integrity Guardian universe. All communication to and from the Protected Object Central Repository are passed through an RC4 Encryption layer 370. In one embodiment, contained within the Protected Object Central Repository are the "Safe Object Store" 372, "Quarantined Object Store" 374, "Repository Database" 376, and the "WebTrends™ Extended Logging Format (WELF) Store" 378.

Safe Object Store 372 is where the Stored Authoritative Copy (SAC) of all protected objects is kept. It is here that the integrity and non-repudiation of the objects is guaranteed. This is a multi-generation store containing not only the most recent version/generation of an object; but also the previous Delta Compressed generations. All objects are verified using both the physical attributes and a Digital Signature.

Quarantined Object Store 374 is similar to the Safe Object Store in its construction and functionality, but differs in its purpose. This store is used exclusively for the holding of objects that have been compromised in some way. By maintaining a isolated replica of these objects, an administrator can later examine them, in complete safety, in order to help derive the cause or purpose of the contamination, without affecting the original environment.

Repository Database 376 contains much of the data essential to the protection of the objects and the configuration of the system. Included in this data are "Alerts", "Event Logging", "Object Container Data", "User Information", "System Configuration Data", "License Data", and the "Digital Signatures".

WebTrends™ Extended Logging Format (WELF) 378 is an industry-standardized format for representing Internet intrusion traffic and activity. This data can then be analyzed by various Commercial Off The Shelf (COTS) packages in order to monitor network health, server stability and data integrity. Other logging formats could also be used.

The Client Component

The Client component is the user interface for administering the System Integrity Guardian environment. Through this client interface, an administrator can determine which servers to protect, and which objects (directories and/or files) to protect (or not) within said server. Also with the Client component, the administrator can define what actions will be taken when an event that breaches integrity occurs. This can include a range of options from just logging the event up to quarantining the effected object(s) and then either removing any undesired object or replacing it with an authoritative copy from the Protected Object Central Repository. The Client interface can also be used to define and view various computer system performance criteria such as CPU utilization, Bandwidth usage, Storage Statistics and the like. Examples of some of these features will be illustrated in FIGS. 14-23.

Figure 14:
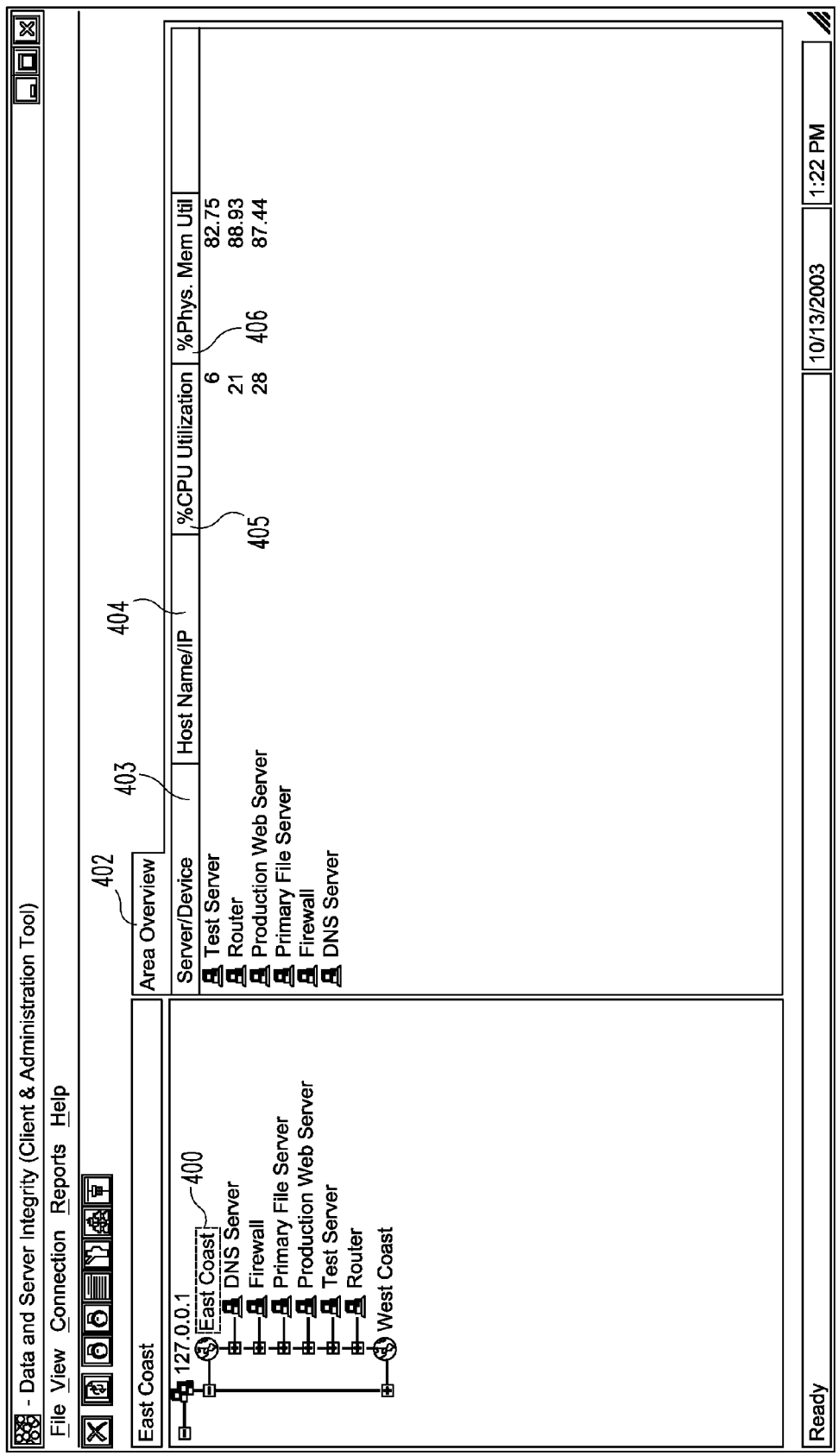
FIG. 14 is a simulated screen of one embodiment showing details about servers for a selected region.

FIG. 14 depicts an example of details displayed about the currently registered servers for the selected region/group. The Area Overview tab 402 provides details about servers in the EastCoast 400 group. For example, the Server/Device 403, Host Name/IP 404, % CPU Utilization 405, and % Physical Memory Utilization 406 attributes of each server in EastCoast 400 group are displayed.

Figure 15:
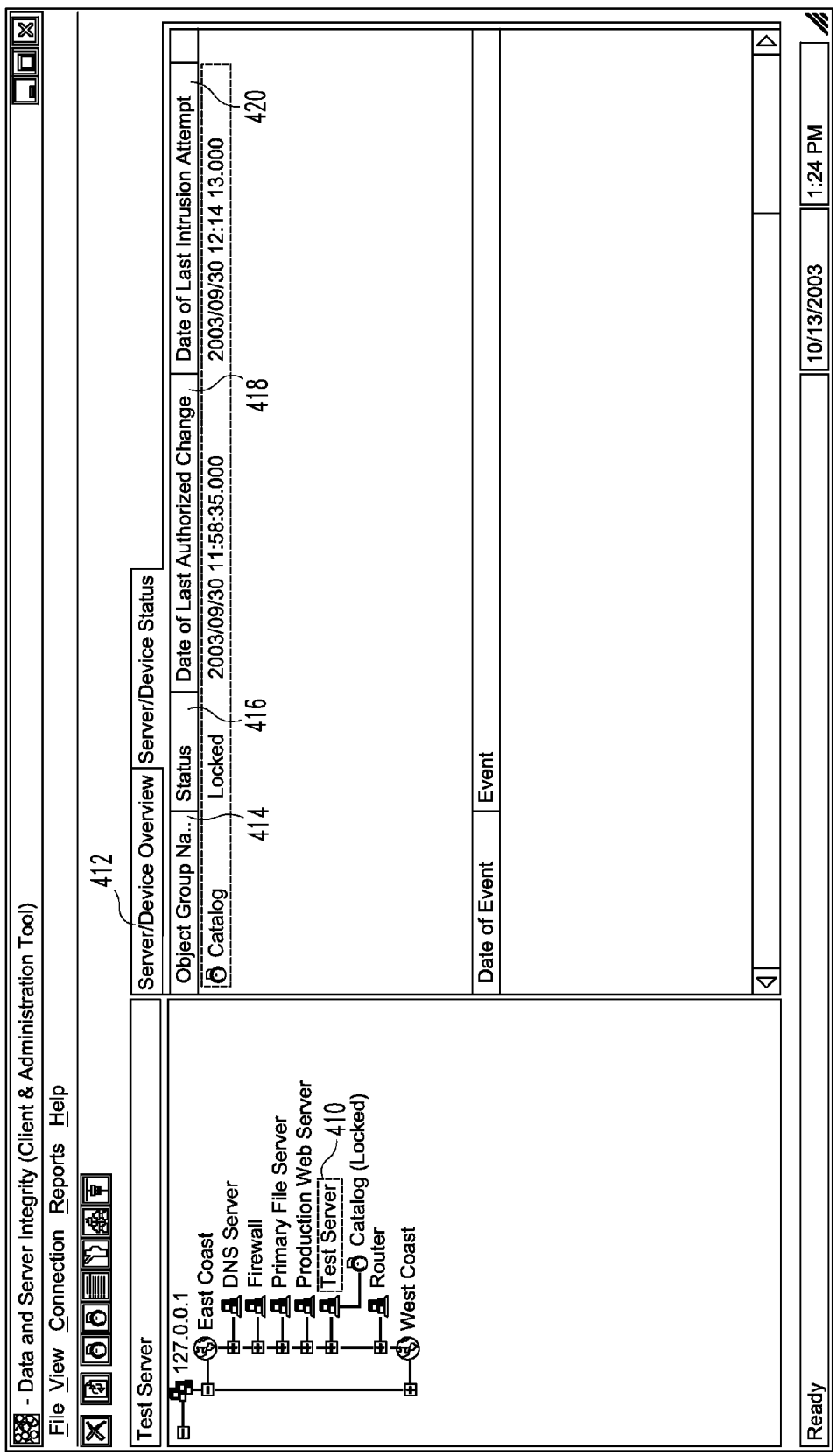
FIG. 15 is a simulated screen of one embodiment showing an overview of a selected server.
Figure 16:
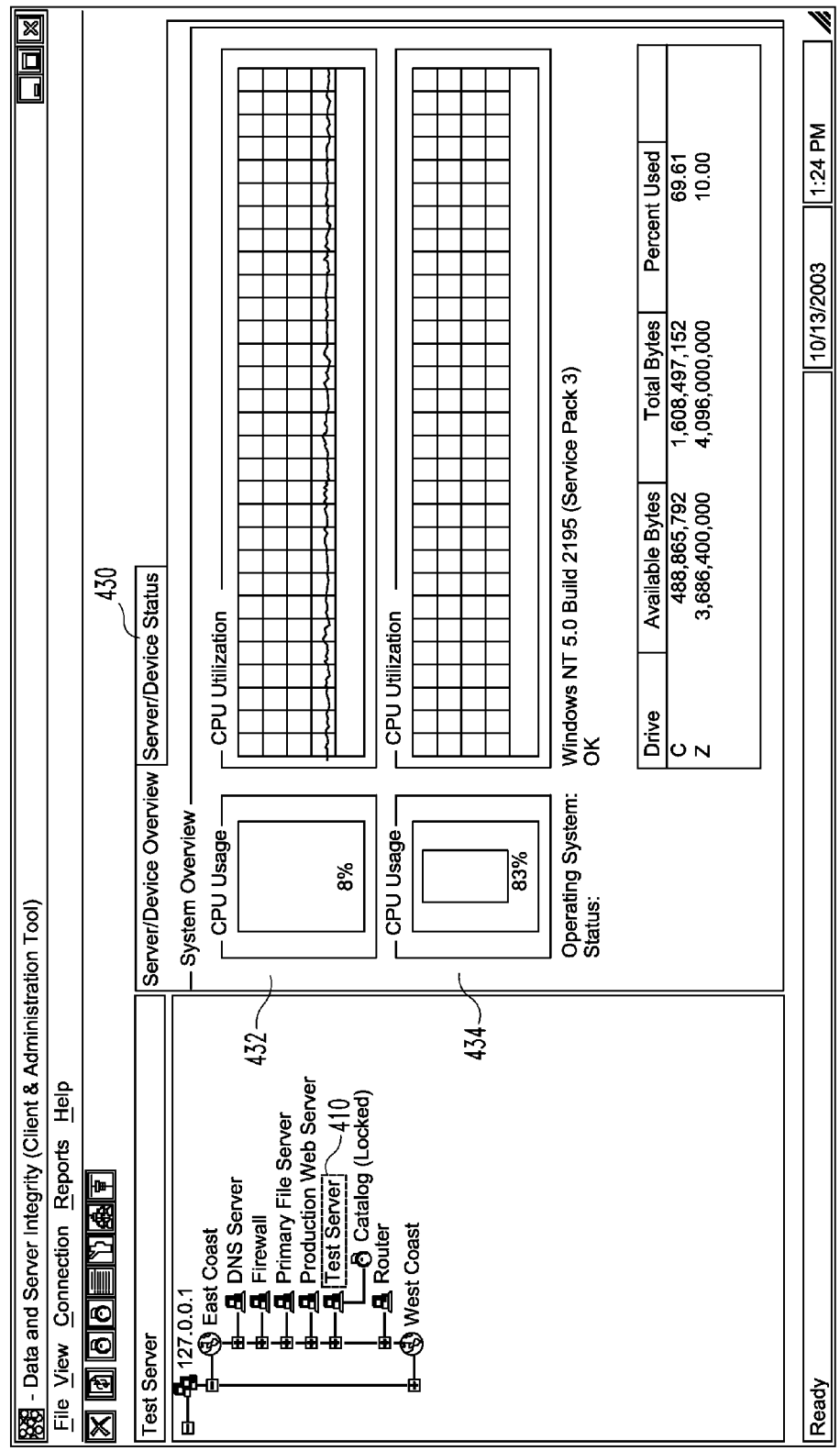
FIG. 16 is a simulated screen of one embodiment showing the status of a selected server.

As shown in FIGS. 15 and 16, details about a particular server can be displayed. For example, FIG. 15 illustrates a Server/Device Overview tab 412 displaying Object Group Name 414, Status 416, Date of Last Authorized Change 418, and Date of Last Intrusion Attempt 420 attributes for the selected Test Server 410. As shown in FIG. 16, the Server/Device Status tab 430 illustrates the CPU usage 432 and Memory Usage 434 attributes of the selected Test Server 410.

Figure 17:
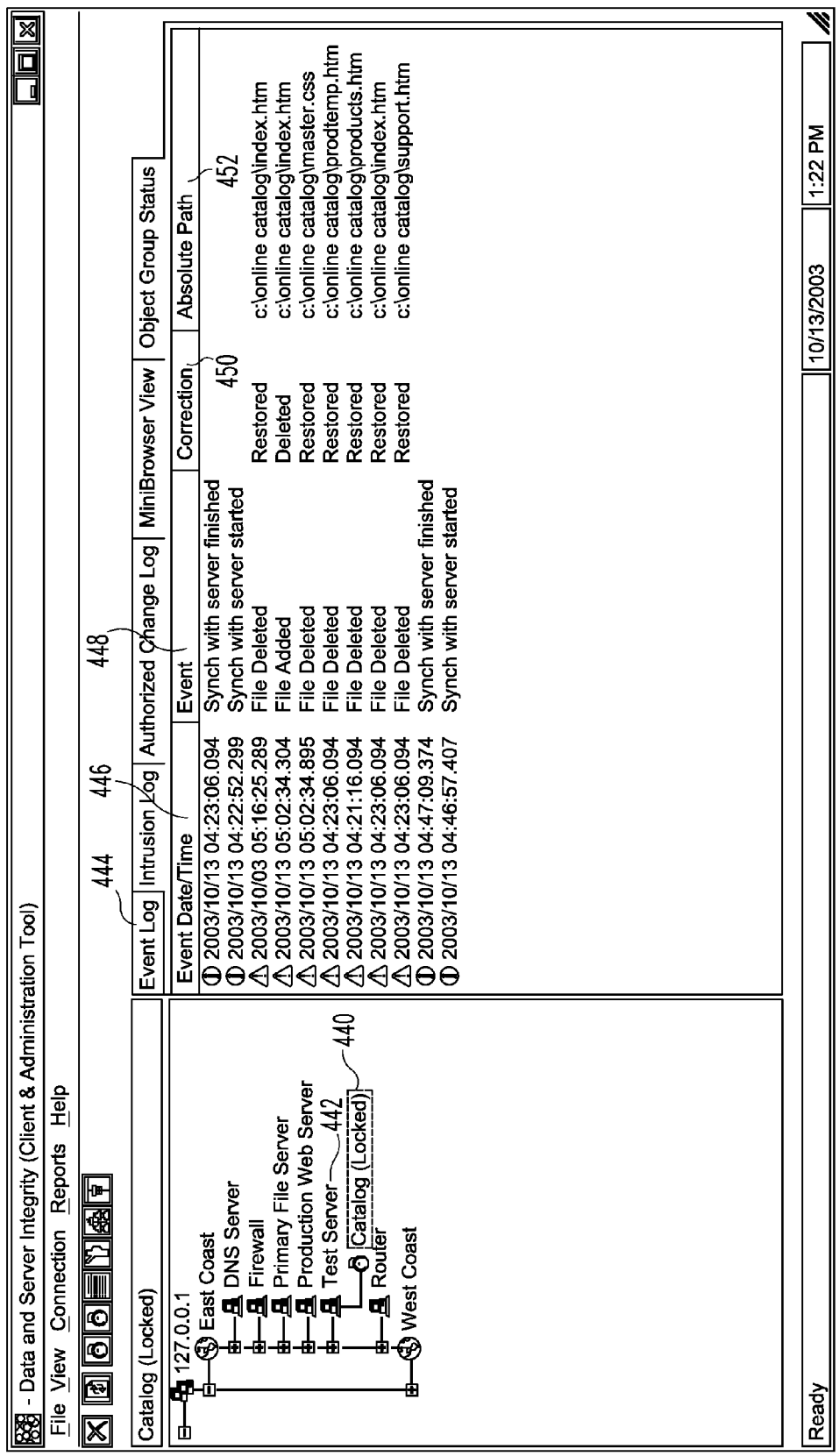
FIG. 17 is a simulated screen of one embodiment showing a list of events that have occurred on a web catalog of a selected server.

As depicted in FIG. 17, the Event Log tab 444 illustrates a list of events that have occurred on the selected Catalog 440 on Test Server 442 including the date and time of the event 446, the event 448, the correction 450, and the absolute path 452. The Intrusion Log tab 460, similar to that depicted in FIG. 18, displays a listing of any files that have been altered in some way, and provides an administrator with the ability to view the contents of the quarantined contents. In this example, several attributes are displayed in the Intrusion Log for Catalog 440 of Test Server 442, such as the Intrusion Number 462, Date/Time 464, Description 466, Size 468, and User 470.

Figure 19:
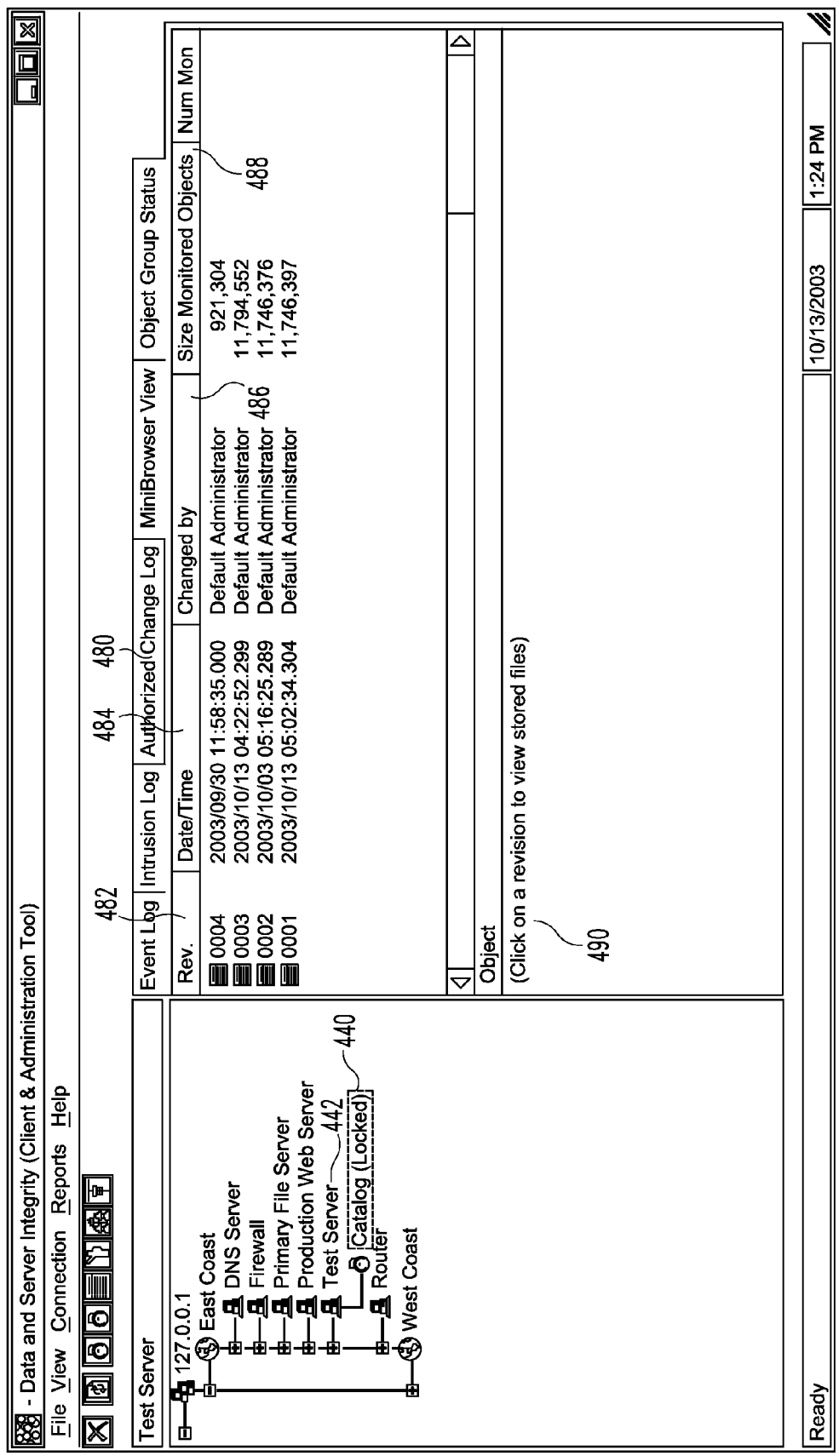
FIG. 19 is a simulated screen of one embodiment showing a change log of the various generations of a web catalog of a selected server.
Figure 20:
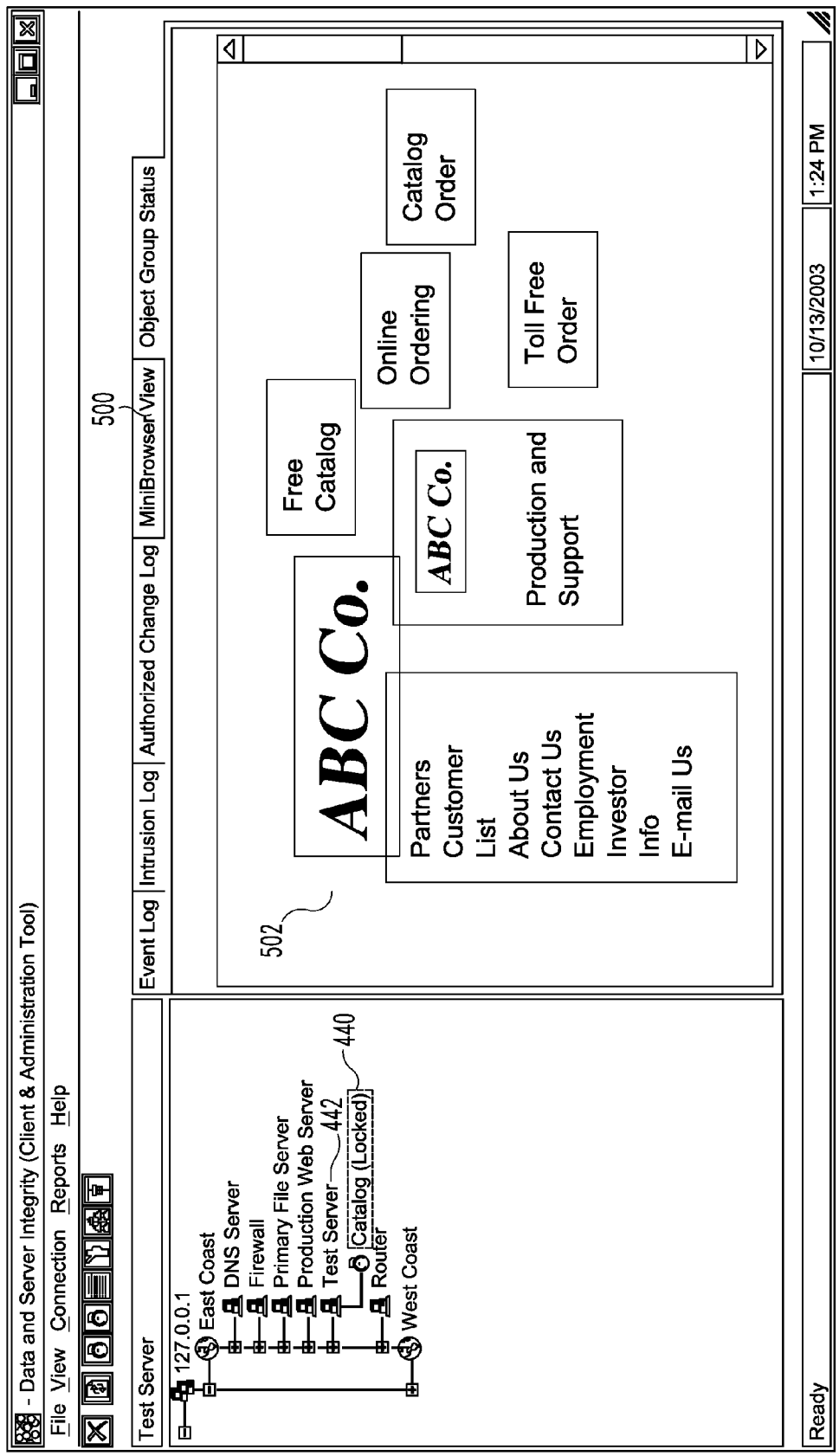
FIG. 20 is a simulated screen of one embodiment showing a Mini Browser that displays an image of a web page as it currently exists in a web catalog of a server.
Figure 21:
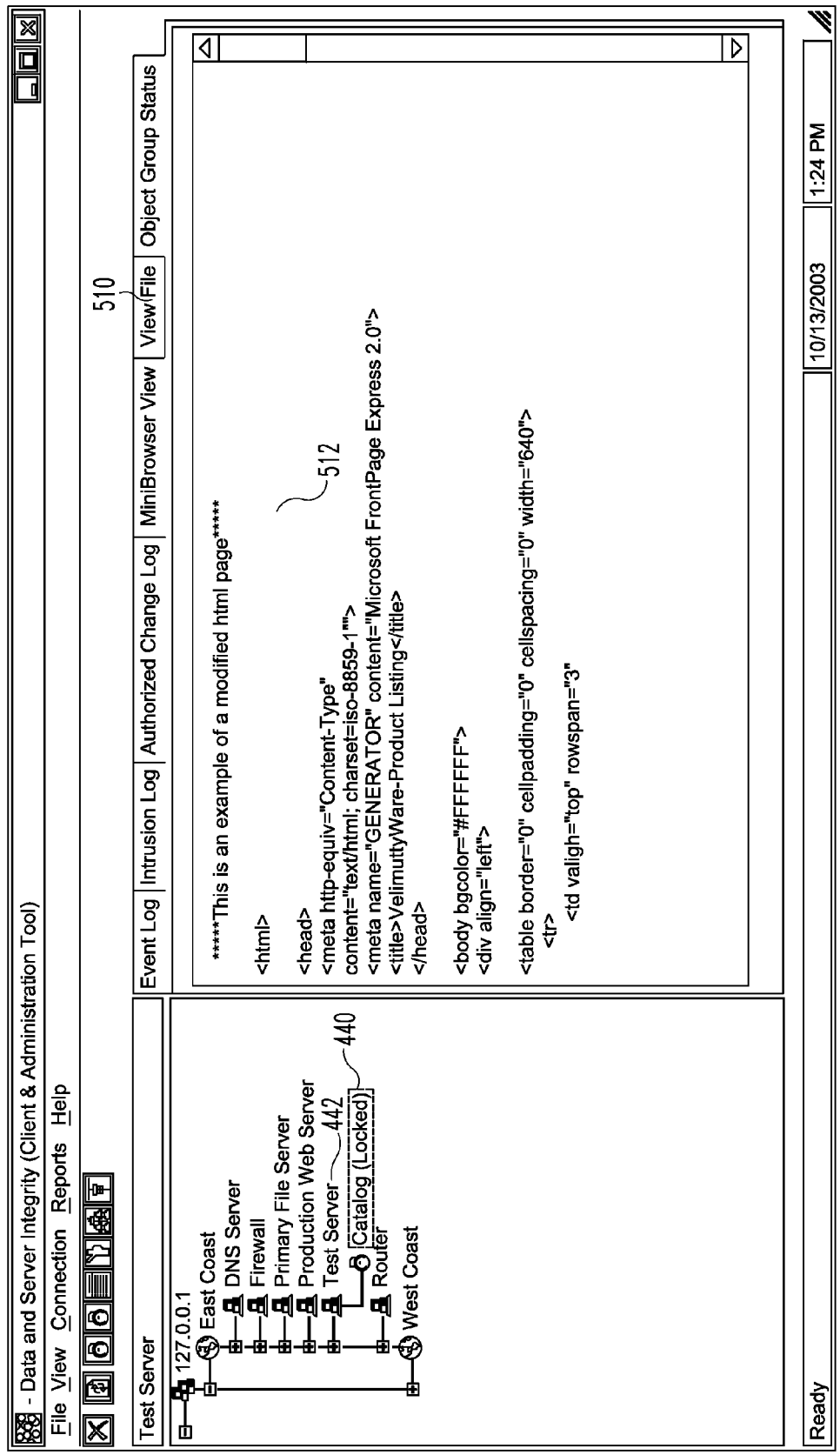
FIG. 21 is a simulated screen of one embodiment showing the contents of a file as it currently exists in a web catalog of a server.
Figure 22:
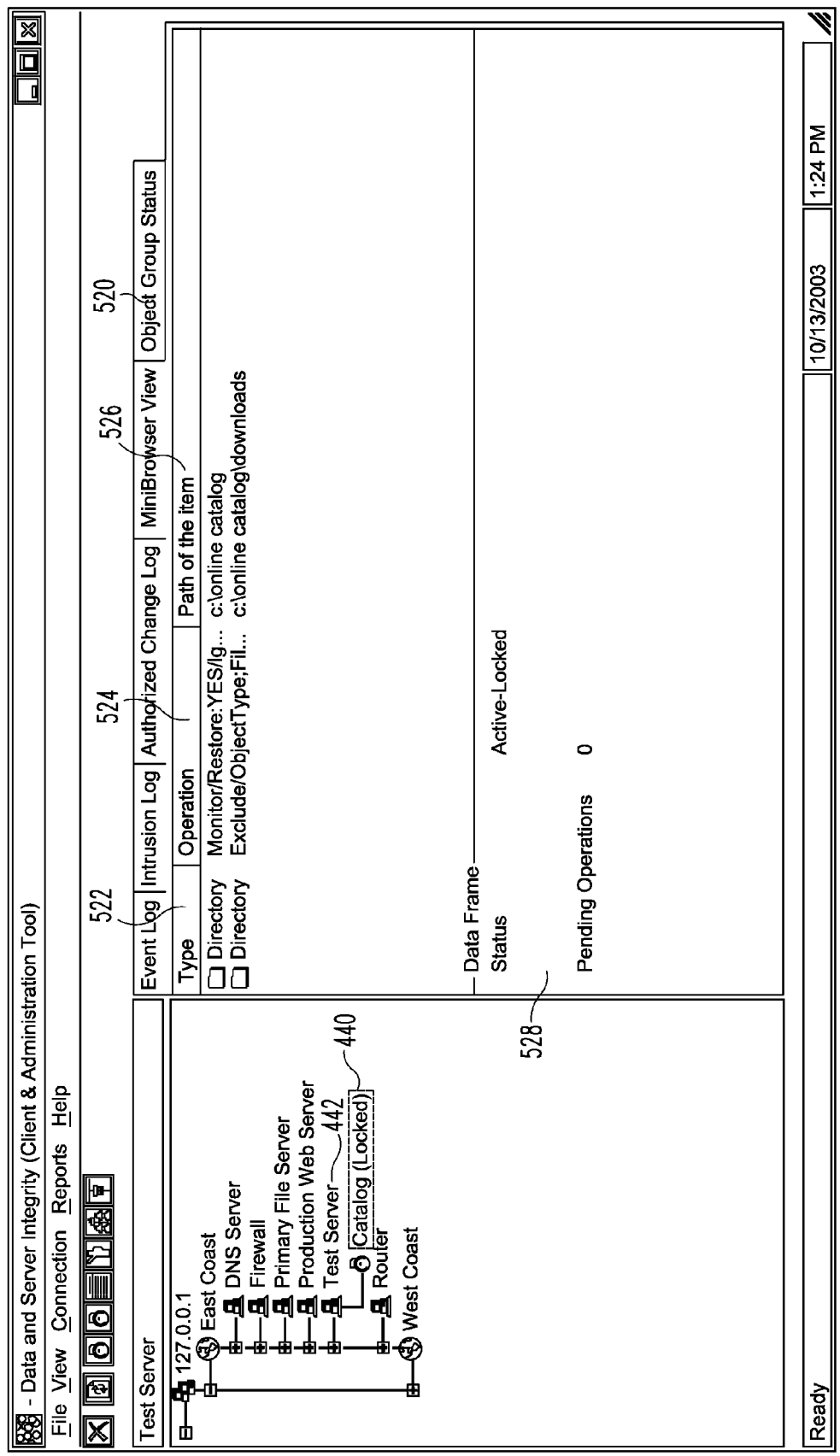
FIG. 22 is a simulated screen of one embodiment showing a status of a group of objects of a web catalog of a selected server.

FIG. 19 is an example of an Authorized Change Log tab 480 that displays the various generations of the website that have been submitted. Included in the information is the revision 482, Date/Time 484, the person who made the change 486, and the size of the generation 488. The user can click on a revision to view stored files 490. An example of the Mini Browser tab 500 that displays an actual browser image 502 of the file as it currently exists in Catalog 440 on Test Server 442 is shown in FIG. 20. FIG. 21 shows the View File tab 510 displaying the contents of a selected file on Catalog 440 on Test Server 442. As shown in FIG. 22, the Object Group Status tab 520 indicates various attributes indicating the status of the object group on Catalog 440 of Test Server 442, such as the Type 522, Operation 524, Path of the item 526.

A user also has the ability to view a file comparison of one version of a file to another. FIG. 23 shows an example file with one version of the file displayed in window 530, highlights selected 532 visually indicating a line where a difference has occurred, and a list comparing the differences between the authoritative copy 534 and the altered copy 536.

The Client interface also offers a diverse array of reports to help an administrator to quickly surmise the condition and status of all computer systems being protected—without wasting precious time inspecting individual logs or multiple emails from each machine. In addition to this GUI interface, there is a Command Line Utility providing for non-graphical environments or Batch Processing.

In one embodiment, a system is disclosed that comprises: a repository interface operative to make a copy of an original object and to store the object copy in a safe object storage; a monitor agent interface operative to monitor the original object to detect a change and send a notification to the repository interface when the change occurs; and wherein said repository interface is further operative to receive the notification from the monitor agent interface, determine that the change to the original object was unauthorized, and restore the object copy from the safe object storage.

In another embodiment, a method is disclosed that comprises: receiving a selection of at least one object to be protected; generating a baseline copy of the object and storing the baseline copy in a safe object storage; monitoring the object; detecting an unauthorized modification to the object; retrieving the baseline copy of the object from the safe object storage; and replacing the modified object with the baseline copy of the object.

In yet another embodiment, a method is disclosed that comprises: storing in a safe object storage a copy of a plurality of objects from at least one directory to be protected; detecting a modification to the directory; determining if the modification was made to one of the objects stored in the safe object storage, and if so, restoring the copy of the corresponding object from the safe object storage; and determining if the modification included adding a new file to the directory that is not stored in the safe object storage, and if so, deleting the added file from the directory.

One of ordinary skill in the computer software art will appreciate that the functionality, components, clients, servers, client interfaces, server interfaces and/or screens described herein can be separated or combined on one or more computers, screens, or components in various arrangements and still be within the spirit of the invention. While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

What is claimed is:

1. A system comprising:
   a repository interface operative to make a copy of an original object and to store the object copy in a safe object storage, wherein the original object resides on a first server and the safe object storage resides a second server remote from the first server;
   a monitor agent interface operative to monitor the original object to detect a change in real time and send a notification to the repository interface when the change is detected; and
   wherein said repository interface is further operative to receive the notification from the monitor agent interface, determine that the change to the original object was unauthorized, and restore the original object on the first server using the object copy from the safe object storage in response to the change;
   wherein the repository interface is further operative to retain a copy of the changed object that can be reviewed after the object copy is restored from the safe object storage.

2. The system of claim 1, wherein said repository interface determines that the change to the original object was unauthorized at least in part-by comparing a digital signature of the object after the change with a digital signature of the object copy.

3. The system of claim 1, wherein the object copy includes a unique digital signature of the original object and a compressed snapshot of the original object.

4. The system of claim 1, wherein the monitor agent interface resides on a computer and the original object being monitored resides on a device.

5. The system of claim 4, wherein the device is a router.

6. The system of claim 4, wherein the device is a firewall.

7. The system of claim 1, wherein the monitor agent interface resides on a same computer as the original object.

8. The system of claim 1, wherein the monitor agent interface resides on a different computer than the original object.

9. The system of claim 1, wherein the original object is part of a web site that resides on a web server.

10. The system of claim 1, wherein the original object is a file residing on a file server.

11. The system of claim 1, wherein the original object is part of a DNS database.

12. The system of claim 1, wherein the original object is part of a database.

13. The system of claim 1, wherein the repository interface is further operative to send a notification to a user indicating that the unauthorized change to the object occurred and that the object copy was automatically restored from the safe object storage.

14. The system of claim 1, further comprising:
   a client interface operative to allow a user to select the original object to indicate the object is to be protected.

15. The system of claim 14, wherein the client interface is a graphical user interface.

16. The system of claim 14, wherein the client interface is a command line utility.

17. The system of claim 1, wherein the original object is a directory containing of a plurality of files, and wherein the object copy includes a copy of the plurality of files.

18. The system of claim 1, wherein the repository interface is further operative to provide retrieval of the object copy from the safe object storage and to restore the object copy to a new location.

19. The system of claim 18, wherein the restoration to the new location is performed in a disaster recovery situation.

20. A method comprising:
   receiving a selection of at least one object to be protected;
   generating a baseline copy of the object and storing the baseline copy in a safe object storage, wherein the at least one object resides on a first server and the safe object storage resides a second server remote from the first server;
   monitoring the object in real time;
   detecting an unauthorized modification to the object in real time;
   in response to detecting the unauthorized modification, retrieving the baseline copy of the object from the safe object storage; and
   replacing the modified object on the first server with the baseline copy of the object.

21. The method of claim 20, wherein the baseline copy includes a digital signature of the object and a compressed snapshot of the object.

22. The method of claim 20, wherein said detecting the unauthorized modification is determined at least in part-by comparing a digital signature of the modified object with a digital signature of the baseline copy.

23. The method of claim 20, wherein the object to be protected is a file residing on the first server.

24. The method of claim 20, wherein the object to be protected is a directory containing a plurality of files.

25. The method of claim 20, wherein the object to be protected is a file residing on a device.

26. The method of claim 25, wherein the device is a firewall.

27. The method of claim 25, wherein the device is a router.

28. The method of claim 20, further comprising:
   sending a notification to a user to indicate that the unauthorized modification occurred and that the baseline copy was automatically restored.

29. The method of claim 28, wherein the notification is sent by a communication mechanism selected from the group consisting of email, internal messaging, and web paging.

30. A method comprising:
   storing remotely in a safe object storage a copy of a plurality of objects from at least one directory to be protected, wherein the directory resides on a first server and the safe object storage resides a second server remote from the first server;
   detecting a modification to the directory in real time;
   determining, in real time, if the modification was made to one of the objects from the directory and for which a copy is stored in the safe object storage, and if so, restoring the modified object on the first server using the copy of the corresponding object from the safe object storage; and
   determining, in real time, if the modification included adding a new file to the directory that is not stored in the safe object storage, and if so, deleting the added file from the directory.

31. The method of claim 30, wherein the objects are files residing on a computer.

32. The method of claim 31, wherein the computer is a web server.

33. The method of claim 30, wherein the objects are entries in a database and wherein the directory to be protected is the database.

34. The method of claim 30, wherein the objects are configuration files on a network device.

* * * * *